(12) United States Patent
    Bucciarelli

(10) Patent No.: US 10,157,435 B2
(45) Date of Patent: Dec. 18, 2018

(54) SYSTEM AND METHOD FOR MONITORING ELECTRONIC COMMUNICATIONS

(71) Applicant: Todd Bucciarelli, Hinsdale, IL (US)

(72) Inventor: Todd Bucciarelli, Hinsdale, IL (US)

( * ) Notice: Subject to any disclaimer, the term of this patent is extended or adjusted under 35 U.S.C. 154(b) by 1013 days.

(21) Appl. No.: 14/466,586

(22) Filed: Aug. 22, 2014

(65) Prior Publication Data

US 2015/0058242 A1    Feb. 26, 2015

Related U.S. Application Data

(60) Provisional application No. 61/959,395, filed on Aug. 22, 2013.

(51) Int. Cl.
    *G06F 15/16* (2006.01)
    *G06Q 50/26* (2012.01)
    *H04W 4/16* (2009.01)
    *H04W 4/14* (2009.01)

(52) U.S. Cl.
    CPC ............ *G06Q 50/265* (2013.01); *H04W 4/14* (2013.01); *H04W 4/16* (2013.01)

(58) Field of Classification Search
    CPC ....... H04K 3/42; H04K 3/86; H04L 29/08072
    USPC .......... 709/203, 220, 224, 227; 455/1, 456.1
    See application file for complete search history.

(56) References Cited

U.S. PATENT DOCUMENTS

| | | | | |
|---|---|---|---|---|
| 8,761,661 B2* | 6/2014 | Brisebois | ................. | H04K 3/42 |
| | | | | 455/1 |
| 8,988,215 B1* | 3/2015 | Trundle | ................ | G08B 25/08 |
| | | | | 340/539.11 |
| 9,141,276 B2* | 9/2015 | Dawes | .................. | G06F 3/0488 |
| 9,515,378 B2* | 12/2016 | Prasad | ................. | H04B 7/0617 |
| 9,578,159 B2* | 2/2017 | Muthukumar | ........... | H01Q 3/00 |
| 2009/0144823 A1* | 6/2009 | Lamastra | ................ | H04L 51/12 |
| | | | | 726/22 |
| 2011/0065419 A1* | 3/2011 | Book | .................... | G06F 21/305 |
| | | | | 455/411 |
| 2012/0244794 A1* | 9/2012 | Brisebois | ................. | H04K 3/42 |
| | | | | 455/1 |
| 2014/0128032 A1* | 5/2014 | Muthukumar | ........... | H01Q 3/00 |
| | | | | 455/411 |
| 2014/0281929 A1* | 9/2014 | Grossman | ............. | G06F 17/212 |
| | | | | 715/243 |

* cited by examiner

*Primary Examiner* — Khanh Q Dinh
(74) *Attorney, Agent, or Firm* — Greer, Burns & Crain, Ltd.

(57) ABSTRACT

A method for monitoring mobile communication and generating alerts associated with targeted content. A link is established between a monitored user's mobile communication device and a monitoring user's mobile communication device to receive communications for monitoring purposes. The monitored user's mobile communication device forwards an incoming or outgoing communication to the monitoring user's mobile communication device. The monitored user's or monitoring user's mobile communication device generates an alert if it is determined that the incoming or outgoing communication contains targeted content, and an alert is provided on the monitoring user's mobile communication device.

13 Claims, 18 Drawing Sheets

Block diagram representing a method for monitoring mobile communications

Figure 3

Target content example data structure

| Content for comparison | Denotes type of content | Description of text string/image |
|---|---|---|
| GNOC | String | Get Naked On Camera |
| Cocaine | String | Drug substance |
| "audio clip with the word sex contained in it" | Audio | Audio communication with the word sex |
| "picture of female nipple " | Image | Female nipple |
| "video clip with sex object" | Video | Video communication showing a sex object |
|  |  |  |

Depiction of real-time SMS or text message monitoring

Depiction of real-time SMS or text message monitoring outgoing messages

Example monitoring user interface with monitored text messages

Example monitoring user interface with alert

SYSTEM AND METHOD FOR MONITORING ELECTRONIC COMMUNICATIONS

PRIORITY CLAIM AND REFERENCE TO RELATED APPLICATION

This application claims priority of U.S. Provisional Patent Application Ser. No. 61/959,395, filed Aug. 22, 2013, entitled "METHODS AND SYSTEMS FOR MOBILE COMMUNICATION MONITORING AND ALERTS." U.S. Provisional Patent Application Ser. No. 61/959,395 is incorporated in its entirety by reference herein.

FIELD OF THE INVENTION

A field of the invention is mobile communications. Particular embodiments of the invention are applicable to monitoring electronic communications between mobile communication devices.

BACKGROUND OF THE INVENTION

Short Message Service (SMS) is a text messaging service component of phone, web, or mobile communication systems, using standardized communications protocols that allow the exchange of text messages (currently up to 160 characters for SMS, though this could change in the future) between fixed line, mobile phone devices or mobile communication devices. Current communication protocols used to deliver such services include GSM, CDMA, GPRS; 3G networks such as W-CDMA, EDGE or CDMA2000 and 4G networks, though additional protocols and networks may be implemented. Text messaging is a widely used communications service provided by wireless carriers (e.g. U.S. Cellular), communication companies (e.g. AT&T) and mobile app companies (e.g. Whatsapp, KiK).

Multimedia Messaging Service, or MMS, is a standard way to send messages that include multimedia content (images, video, etc.) to and from mobile phones and mobile communication devices. It extends the core SMS (Short Message Service) capability that currently allows exchange of text messages only up to 160 characters in length. A popular use of MMS is to send photographs from camera-equipped handsets, although it is also popular as a method of delivering news and entertainment content including videos, pictures, text pages and ringtones. The standard is developed by the Open Mobile Alliance (OMA), although during development it was part of the 3GPP and WAP groups.

Text messages, images (pictures), video and audio can be transmitted using Wi-Fi, Bluetooth or other wireless technology over the Internet and without use of cellular communication infrastructure. As such, SMS and MMS are emulated by mobile applications ("Mobile Apps") that provide this type of functionality. Additional functionality such as audio, video and audio/video content can be transmitted and received with these types of Mobile Apps.

Though electronic messaging such as, but not limited to, SMS, MMS and text messaging (i.e. via mobile apps) has been widely adopted and has proven very useful, the inherent dangers of electronic messaging and related communications such as cyber-bullying, the transmission and receiving of sexual images ("sexting") and other inappropriate or other targeted content have been well publicized. The present inventor has recognized that the need to monitor these types of communications during cell phone (more specifically, what is commonly referred to as a "smartphone") or mobile communication device use is becoming increasingly more important.

Other growing issues related to the private usage of mobile communications devices such as, but not limited to, laptop computers, tablet PCs (tablet computer), gaming devices, cell phones, PDAs (Personal Data Assistants) and other communication devices is with unsolicited contact by predators to children, facilitation of illegal drug and alcohol activities, and the malicious broadcasting of content intended to be private. Due to the portability of mobile communications devices such as cell phones, children (and people) have regular opportunities to engage in electronic messaging such as text message exchanges that have inappropriate or illegal content unbeknownst to their parents.

Many parents and guardians that have children with mobile communication devices (e.g. cell phones or other devices that enable text messaging) are interested in protecting their children from the inherent dangers and ramifications associated with inappropriate or undesirable text messaging communications described herein. However, the present inventor has recognized that such parents or guardians are unable to easily or effectively monitor the content being transmitted and received on their children's cell phones or other devices that enable text messaging and electronic communications. This is due in part to the lack of transparency, anonymity and the mobile nature of cell phones and other hand-held (mobile) communication devices.

Text messages, images, video and audio can also be transmitted and received directly over the Internet using a Wi-Fi, Bluetooth or via other technologies that enables mobile communication devices to connect wirelessly to the Internet. To this end, mobile applications (mobile apps) now exist that emulate SMS and MMS functionality.

In general, it has been recognized that users (e.g. parents, guardians and family member) of mobile communication devices (for example but not limited to SMS and MMS messages communicated via a handheld smartphone such as a BlackBerry, iPhone, cellular phone running an Android operating system or another portable computing device capable of receiving and/or sending wireless communications) face concerns regarding various aspects of communications to/from such mobile communication devices. Examples of this include the appropriateness, inappropriateness, safety and legality of such communications. For example, people (such as parents or guardians of children) may be concerned about the language, the meaning of acronyms, the meaning of short hand, content, pictures and/or elements included in the child communications.

Some example systems and methods of the present invention address one or more of these concerns by providing preferably near real-time monitoring of text messaging to address these and other related problems and issues.

SUMMARY OF THE INVENTION

An example embodiment of the invention provides, among other things, a method for monitoring mobile communication and generating alerts associated with targeted content. In an example method, a link is established between monitoring user's mobile communication device and a monitored user's mobile communication device to receive communications for monitoring purposes. In some example embodiments, the monitoring user's mobile communication device is authenticated to receive communications from a monitored user's mobile communication device (e.g., for monitoring purposes). The monitored user's mobile communication device forwards an incoming or outgoing electronic communication to the monitoring user's mobile communication device. The monitored user's or monitoring user's mobile communication device generates an alert if it is determined that the incoming or outgoing electronic communication contains targeted content. The alert is provided on the monitoring user's mobile communication device, e.g., displayed, sounded, presented via haptic feedback, etc. In some embodiments, the targeted content associated with the alert and/or a description of the target content (e.g. description of an acronym) may be provided on the monitoring user's mobile communication device for review by the monitoring user.

BRIEF DESCRIPTION OF THE DRAWINGS

The foregoing and other features, aspects and advantages of the invention are described in detail below with reference to the drawings of various embodiments, in which:

FIG. 3 is an example of a portion of a data structure for use in accordance with some embodiments.

DETAILED DESCRIPTION

Figure 1:
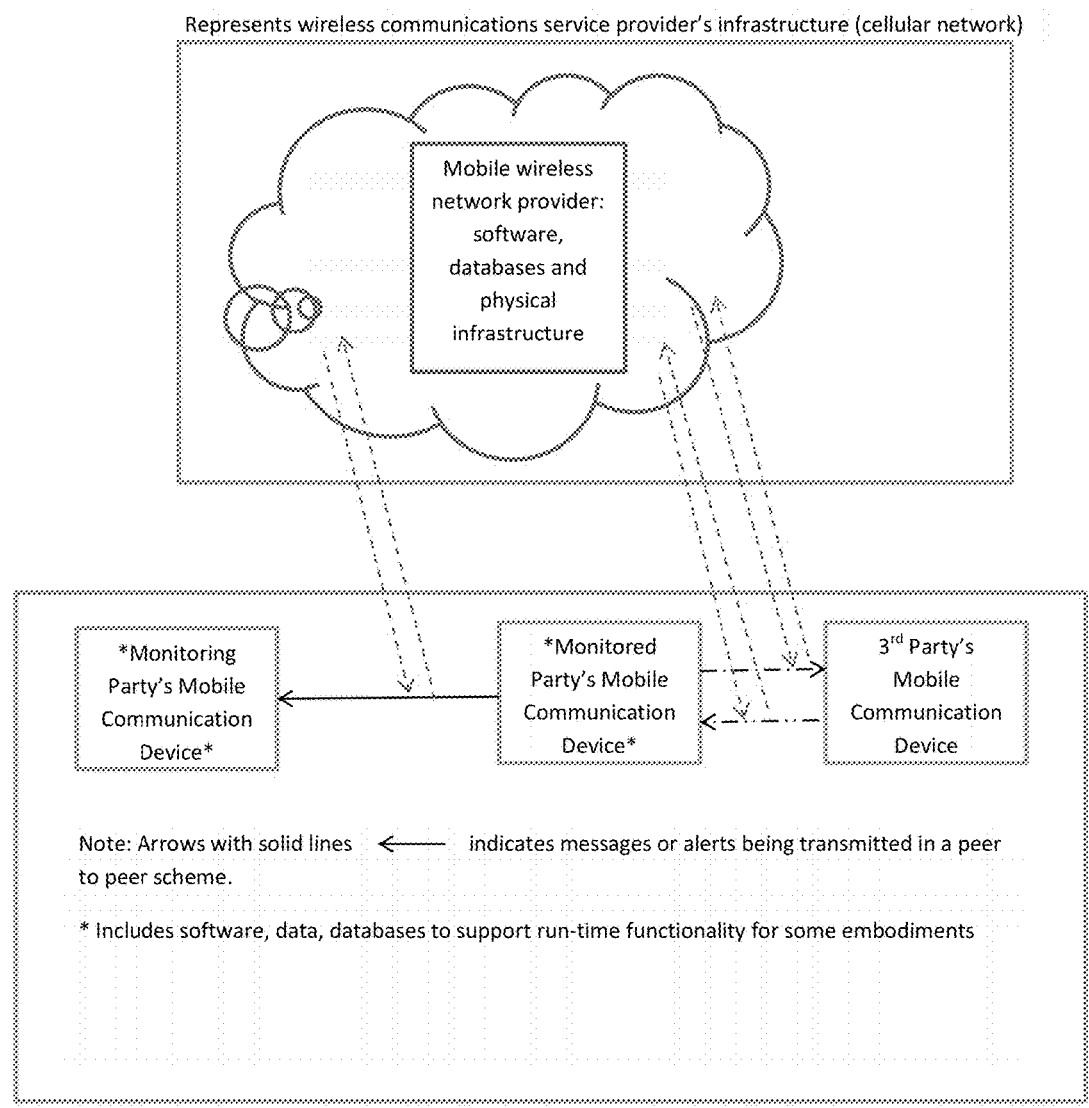
FIG. 1 is a schematic diagram of an embodiment for facilitating wireless communication among communication devices, in accordance with some embodiments.

Example embodiments of the invention provide, among other things, systems and methods for monitoring electronic communications. Such systems and methods in example embodiments further provide alerts of particular targeted content, such as inappropriate or illegal content, within electronic communications. Example systems and methods can provided for monitoring a single user, or multiple users, and can be performed by a single monitoring user or by multiple monitoring users. Non-limiting examples of mobile communication devices include cell phones, smartphones, iPhones, Windows phones, Samsung cell phones, Android phones, cell phones that have memory and processor(s), cell phones that run a mobile operating system such as Android, webOS, iOS, Blackberry OS, Symbian, Windows Mobile Professional, tablet computers, iPads, iPods, PDAs (Personal Digital Assistant) or other portable communication devices. Future mobile communication devices may include technologies under development such as Google Glass, smartphones incorporating cloud-based technologies or cloud-based operating systems or cloud-based computing schemes.

As used herein, the terms text message, text messages or text messaging is intended to include SMS (Short Message Service), MMS (Multimedia Messaging Service) and other types of electronic messaging services or applications including but not limited to those that transmit text, text strings, characters and/or multimedia over the Internet via a Wi-Fi, Bluetooth or other wireless technology connection. Future messaging services that utilize other electronic data transmission technologies, for example X-ray, RF (Radio Frequency), infrared, visible light, ultraviolet and gamma rays technologies or cloud computing technologies or schemes (e.g. cloud messaging), may be applicable to some embodiments herein.

Mobile communications devices include, but are not limited to, Personal Digital Assistants (PDAs), cell phones, mobile phones, Smartphones, iPods, iPads, gaming devices, mobile computers, Tablet PCs and any other electronic device for which transmitting and receiving text messages are frequently utilized (also referred to herein as a mobile communication device). Example embodiments described herein refer to cell phones, however, such description is intended to also apply, where feasible, to mobile communication devices generally.

As used herein, the term software, mobile application, mobile app is intended to mean either software or firmware. Note that a mobile app may be downloaded and installed on a smartphone or mobile communication device whereby a smartphone or mobile communication device may have hardware or chips that have the software (application code) programmed into them. In the case firmware, the software is essentially built into the hardware of the smartphone or mobile communication device (which does not need to be downloaded or installed). Additionally, it is also possible to incorporate software into the operating system of the smartphone or mobile communication device so that it is integrated into the smartphone or mobile communication device (not needing mobile app software to be downloaded and installed by the end user). It will be appreciated that description herein for example methods will likewise be applicable to suitably configured mobile communications devices, software or firmware (e.g., mobile apps), or networks or architectures (peer-to-peer or other networks) that perform one or more features of the method.

As used herein, the term "electronic message" or the term "electronic communication" is intended to mean any type of message that can be transmitted or received by a mobile communication device, including but not limited to a text message, SMS, image (picture), MMS, audio clip, video clip, audio/video clip, live audio segment, live video segment or electronic message.

In an example method for monitoring mobile communication and generating alerts associated with targeted content, such as potentially inappropriate or illegal content, a link is established between a user's mobile communication device to be monitored and a user's mobile communication device to receive communications for monitoring purposes. The devices may also be authenticated or registered, though such authentication is not required in all embodiments. The monitoring user's (also referred to herein as monitoring party or monitoring party's) mobile communication device ("monitoring device") receives communication (i.e. via message forwarding), either incoming or outgoing, from a user's (also referred to herein as monitored party or monitored party's) mobile communication device being monitored (monitored device). In some example embodiments, only incoming, or alternatively only outgoing, communications are monitored.

The monitored user's mobile communication device generates and transmits an alert to the user's mobile communication device monitoring the communications if the application software running on the monitored user's mobile communication device determines that a communication contains targeted content. Determining whether a communication contains targeted content can be accomplished, for example, by comparing the content of the communication to a library of targeted content, such as inappropriate and/or illegal violations, stored in a local database (or data structure) including text strings, images, audio clips and video clips. Example software can search for exact matches or comparable matches (e.g. comparable match could be an image in the local database that resembles the image in a communication) within the local database to determine if it should generate an alert to be transmitted to the monitoring user's mobile communication device. The alert is provided, e.g., displayed, sounded, provided via haptic feedback, etc. on the monitoring mobile communication device.

For example, the monitoring user's mobile communication device can receive alerts transmitted (forwarded) from a monitored user's mobile communication device when potentially inappropriate or illegal content is determined by the software after searching a local database (or data structure) of predefined text strings and/or images and/or audio clips and/or video clips residing on the user's mobile communication device being monitored.

In a particular example method, the communications between the monitored user and the monitoring user is implemented in a peer-to-peer network scheme (i.e. peer-to-peer architecture). For example, run-time software of a mobile application resides (is installed) on all monitoring and monitored mobile communication devices. The monitored mobile communication device's run-time software forwards text messages, MMS or other electronic communications to the monitoring mobile communications device's run-time software and not to an intermediary server. In this way, an example implementation of some embodiments need not require an intermediary or centralized server (or servers) to carry out its run-time functionality. Servers may be implemented for downloading example software (e.g., mobile app) to mobile communication devices and uploading keywords and/or images and/or audio clips to the local database or data structure on the monitored user's mobile communication device (non-run-time activities). However, during the run-time execution of the software providing the communication monitoring and alerts, no intermediary or centralized servers are necessary by the example application software to provide this functionality.

It should be noted that the mobile communications service providers (i.e. Verizon, AT&T, T-Mobile, etc.) may use servers to implement their specific services for SMS, MMS, voice mail, live voice communication or instant messaging (IM), however this level of communication for an example implementation of the invention is preferably carried out as a request from the application software to the operating system of the mobile communication device, which then requests service to receive an interrupt pertaining to a new incoming text message or outgoing text message, from the mobile communication device's operating system. Another example implementation is to incorporate polling to look for new activity occurring in the communication buffers for text messages, MMS or other types of electronic communications. Mobile network (cellular network) providers include services for SMS and MMS by incorporating SMSC (Short Messaging Service Center) and/or MSC (Multimedia Messaging Service Center) in there network elements.

Another embodiment provides, among other things, a method for monitoring mobile communication including reading and storing each character input by a monitored user when entering in information on a monitored mobile communication device (e.g. keyboard/keyboard device, on-screen keyboard, voice input, pointing device). The character inputs are analyzed and/or parsed for a text message style communication that utilizes the Internet for a transmission network (rather than a SMSC or MMSC type network). The content of the text strings (i.e. contiguous characters stored that where input by the user) stored by the software that is intended for another user to read or see (e.g. text message, images) is transmitted to the monitoring user's mobile communication device.

In an example embodiment, the monitored user's mobile communication device receives characters input on the monitored user's mobile communication device and analyzes/parses the character strings for text message style communications (the portion of the characters that comprise a message or image to be read/viewed by another user) to be compared against a list of predefined text strings, images and video clips that are deemed to be targeted content, e.g., inappropriate or illegal content, for a direct match or a comparable match. Provided a direct match or comparable match is determined, then the character string or image that may have the target content is transmitted (forwarded) to the monitoring user's mobile communication device. In another example embodiment, provided a direct match or comparable match is determined, the example software generates an alert that is transmitted (sent) to the monitoring user's mobile communication device.

In an example embodiment, the information about the names of the applications (mobile app) running on the monitored mobile communication device can be read from the device's operating system and used by the software as intelligence as to what text messaging type software (Whatsapp, KiK, Snapchat) is being used by the monitored user. Based on this information, the format of the character strings and images being communicated to other mobile communication devices can be more readily determined. For example, Snapchat allows multimedia (for example, pictures) to be transmitted from one party's smartphone to another party's smartphone whereby the user's receiving the pictures on their smartphone will only be able to view them for a designated period of time and then they are no long accessible. This embodiment would, for example, enable a monitoring user to receive a copy of and store such pictures for viewing at their convenience.

An example system and method works with two or more mobile communication devices (particular non-limiting examples including IPHONE, BLACKBERRY, SAMSUNG GALAXY). At least one mobile communication device is the device being monitored ("Monitored Device") and at least one additional mobile communication device is the device conducting the monitoring ("Monitoring Device"). The monitoring and monitored mobile communication devices all have application software (e.g., an app) downloaded, installed and running on the devices in order to implement the functionality. In addition, data is stored in a database or data structures on the monitored mobile communication device for supporting the application software.

An example application software for monitoring mobile communications provides various functions, such as:

1) the forwarding of communications on the monitored mobile communication device(s) to the monitoring mobile communication device(s). It should be noted that a monitored mobile communication device can be monitored by more than one monitoring mobile communication devices and that a monitoring mobile communication device can monitor multiple monitored mobile communication devices 2) the generation and transmission of alerts when the application software on a monitored mobile communication device determines that a communication has potentially inappropriate, illegal or target content. This function preferably utilizes a database or data structure of predefined text strings, images, audio clips and video clips stored on the monitored mobile communication device (or on the monitoring mobile communications device);

3) the forwarding of characters or images generated by the monitored mobile communication device as the user types (or otherwise enters in) characters, one by one, on a character input mechanism, an example for which is an on-screen keyboard or a physical keyboard, to the monitoring mobile communication device(s) or as the user creates images facilitated by the mobile communication device, an example for which is a picture taken using a camera integrated into a mobile phone. Voice recognition input mechanisms is another example of an input mechanism to a mobile communication device.

Additional embodiments provide, among other things, a method for monitoring mobile communication by reading and storing each image moved from memory to the image buffer of the mobile communication device (i.e. the operating system of the mobile communication device) by a monitored user (e.g. a picture/photograph to be sent to another user) to be stored by the software and transmitted (forwarded) to the monitoring user's mobile communication device. In this example method, the monitored user's mobile communication device moves an image from memory to the image buffer of the mobile communication device and compares that image to list of predefined images that are deemed to be targeted content, such as inappropriate, illegal or targeted content, for a direct match or a comparable match. Provided a direct match or comparable match is determined, then the image that may have the targeted content is transmitted (forwarded) to the monitoring user's mobile communication device. Alternatively or additionally, the monitored user's mobile communication device moves an image from memory to the image buffer of the mobile communication device and compares that image to list of predefined images that are deemed to be targeted content for a direct match or a comparable match. Provided a direct match or comparable match is determined, then the example software generates an alert that is transmitted (sent) to the monitoring user's mobile communication device.

Example embodiments provide methods and systems for monitoring and analyzing communications of a monitored user on behalf of a monitoring user, for transmitting communications (message forwarding) to monitoring users. Additionally, alerts of potentially inappropriate, illegal or targeted content are provided (transmitted) to the monitoring users. For example, text messages, SMS messages, MMS messages, IMs, e-mails, social network site postings or voice mails of a child may be monitored on behalf of a parent. In one embodiment, communications occurring on a child's communication device (cell phone, smartphone, iPod, iPad, etc.) are forwarded (transmitted) to one or more monitoring user(s).

Additionally, an algorithm can be used to analyze the communication for matches (or close similarities) to stored elements (for example, words, text strings, character strings, acronyms, images, audio clips, video clips) ("Stored Elements") in a database residing on the communication device being monitored, through a comparison process to assess the potential of targeted content, such as inappropriate or illegal content. The Stored Elements preferably are updated and uploaded periodically to maintain up-to-date information in the local database (note that this is an operation that need not be executed as part of some embodiments' run-time functionality, e.g., the upload does not negate an example peer to peer scheme). One reason for the updates is to stay current with the latest acronyms and short hand used during text messaging (SMS messages) by children. New acronyms with potentially inappropriate or illegal content are created by users frequently. For example, currently the acronym GNOC has been known to mean "Get Naked On Camera". When the algorithm determines that the communication has a match or close similarity to a match, it will generate an alert that is transmitted (sent) to the monitoring user's communication device. In another example, when comparing an image from the monitored user's mobile communication device to the Stored Elements, the comparison process may use a close proximity match to determine if the image contains sexual content. Although there may not be a direct match, it can be determined that through a close proximity comparison algorithm, for example, that an image should be categorized as sexual in its nature.

Although there are many applications for different embodiments, one example application enables parents to monitor text messages from their cell phone, smartphone or mobile communication device occurring on their children's cell phones, smartphones or other mobile communications devices. This includes monitoring outgoing messages (e.g. text messages) sent by the child and incoming messages (e.g. text messages) being transmitted to the child's cell phone (or communication device) by forwarding the messages to the parent's cell phone, smartphone or mobile communication device. The monitoring (or the viewing of these messages) occurs on the parent's cell phone, smartphone or mobile communication device through a mobile app that is installed on the parent's device and child's device.

In one embodiment, for security purposes, authentication (or registration) may be performed between the monitoring device and the monitored device ("remote cell phone") to be monitored, prior to any text messages or electronic communications being forwarded (transmitted) to the monitoring device. In one embodiment, this is accomplished through a request sent by the monitoring device (or devices) to a cell phone, smartphone or mobile communication device to be monitored (monitored device), e.g., a remote cell phone. The person with the remote cell phone must accept this request to validate the monitoring party's cell phone, smartphone or mobile communication device and acknowledge that the monitoring party will have the capability to monitor text messages and other electronic communications occurring on their cell phone, smartphone or mobile communication device.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

Although several embodiments, examples and illustrations are disclosed below, it will be understood by those of ordinary skill in the art that the invention(s) described herein extend(s) beyond the specifically disclosed embodiments, examples and illustrations and includes other uses of the invention(s) and obvious modifications and equivalents thereof. Embodiments of the invention(s) are described with reference to the accompanying figures. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Certain aspects, advantages, and novel features are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Figure 2:
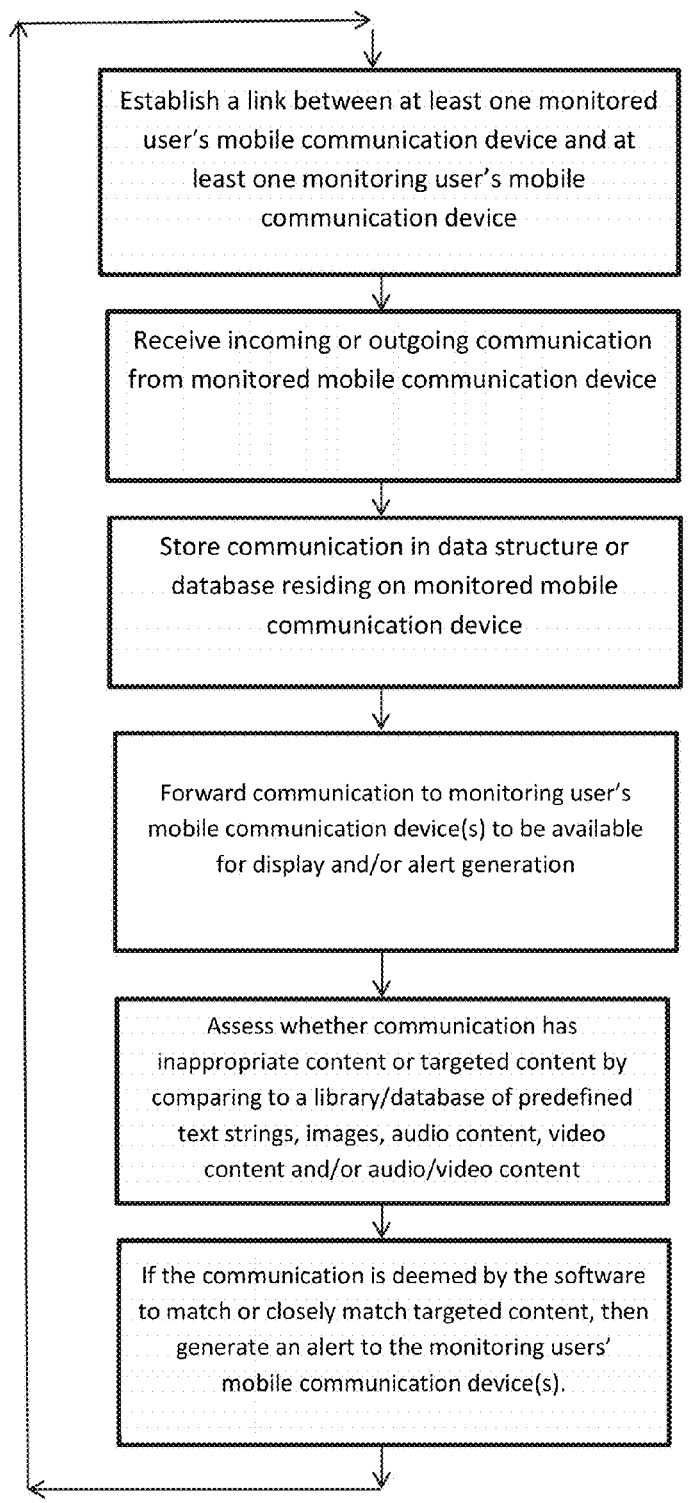
FIG. 2 shows a block diagram of a method for monitoring communications on mobile communication devices and generating alerts in accordance with some embodiments.

FIG. 1 is a schematic diagram of an embodiment of a system for facilitating wireless communication among communication devices, in accordance with some embodiments. FIG. 1 shows an example of software (mobile app) communicating directly to other mobile communication devices in a peer to peer scheme and utilizing a mobile wireless provider's SMS/MMS infrastructure (i.e. cellular network). This illustrates a mobile wireless communication provider's infrastructure utilized to support some embodiments. FIG. 1 further shows an example of application level software (mobile app) according to particular embodiments. In FIG. 1, arrow with solid line indicates messages being transmitted to the monitoring party in a peer to peer scheme at the application level. Alerts or warnings are also transmitted to the monitoring party's mobile communication device in a peer to peer scheme whereby the software, data and databases necessary to carry out the run-time functionality of some embodiments reside on the monitoring and monitored mobile communication devices and do not require logging into an intermediary server to access the information provided by such embodiments FIG. 2 shows a block diagram representing a method for monitoring of communications on mobile communication devices in accordance with some embodiments. In FIG. 2, communications are obtained from one or more mobile communication devices being monitored (a "Monitored Device") and such communications are forwarded to one or more other mobile communication devices authenticated to monitor such communications (a "Monitoring Device"). Additionally, should the communications be determined to contain targeted content, such as potentially inappropriate or illegal content, than an alert will also be transmitted to the mobile communication devices authenticated to monitor the Monitored Device.

Before or concurrently with monitoring, a link is preferably established between the monitoring user's mobile communication device and the monitored user's mobile communication device. This link can be established, for instance by the software requesting and receiving a monitored user's mobile communication devices (e.g., ID number, phone number, etc.), sending and receiving (e.g., accepting) a message from one or more of the devices to another one or more of the devices, handshaking, etc. Establishing the links can be accompanied by authentication or registration in some embodiments. Such links can be peer to peer or other direct link, server based, established during installation for one or both of the devices, or in other manners. Such establishing of a link can be, but need not be, performed prior to or concurrently with any of the example methods provided herein.

FIG. 3 shows an example portion of a data structure with stored text strings, images, audio clips and video clips for the generation of alerts. The example data structure may be in a database with a library (dictionary) of text strings, images, video clip and audio clips to be used when the software (mobile app) of an embodiment of this invention analyzes communications (e.g. SMS, MMS messages, voice mail) for targeted content, such as inappropriate or illegal content, for the generation of alerts to be transmitted from the mobile communication device. The data structure can be part of a database (or standalone) for which some embodiments use as a reference to determine, through direct match or analyzed for a close proximity match, if communications are deemed to be potentially inappropriate or illegal and warrant an alert (notice or warning) to be generated and transmitted to monitoring parties (e.g. an alert sent to a parent's mobile communication device when potentially inappropriate content was detected on their child's mobile communication device). Example alerts that can be provided include but are not limited to, one or more of the following: icon on the status bar of a monitoring mobile communication device's user interface/main screen, icon displayed at any designated location on a monitoring mobile communication device user interface, pop up message, text message, SMS, MMS, image, audio clip, live audio message, video clip, live video message, audio/video clip, live audio/video message, vibration, instant message or any type of notification that can be incorporated with a mobile communication device (of a monitoring user).

An example of a close proximity match is determining if an image in a communication (e.g. MMS) matches that of an image in the data structure/database that contains pre-defined text strings, images, audio clips and video clips of potential inappropriate or illegal content. Content analysis may incorporate image comparison, matrix comparison, raster comparison, pixel comparison, facial recognition algorithms/software/services or any other technique, software, utility, service or computational model used to determine that an image is a close match to a defined or target content (PerceptualDiff utility, currently available via the Internet at pdiff.sourceforge.net, is a particular, non-limiting example).

A specific, non-limiting example application monitors a MMS communication that has a picture of a female breast. The MMS communication is compared to similar images in the data structure or database for a reasonable match (close proximity match). If the software deems there is a reasonable match, then an alert may be generated and transmitted, for example, to the monitoring parties (e.g. parent) indicating that an electronic message with potential sexual content was detected. The concept of children engaging in the transmission/receipt of sexually explicit images on smartphones ("Sexting") activities has become an issue with mobile communications, and such activity between a minor and an adult is currently illegal in the United States.

Preferably, example systems and methods accomplish their run-time functionality for providing monitoring capabilities and alerts through a peer to peer network scheme (i.e. peer to peer network architecture). Advantages to the peer to peer network scheme for this example application include but are not limited to the following:

1) Ease of use—There is no need to login to a server through a web-browser on a cell phone, smartphone, mobile communication device, computer, PC, tablet PC or any other computing device that can browse the Internet in order to access text messages being monitored. Example embodiments use application software (mobile app) that runs (is executed) on the monitoring and monitored cell phones hardware directly and receives and stores the text messages being monitored in the memory (database) of the monitoring cell phone, smartphone or mobile communication device hardware directly and not on an intermediary or centralized server.

2) Better data security for the text messages being monitored—Being that all the text messages being forwarded (transmitted) to the monitoring cell phone, smartphone or mobile communication device are stored exclusively on the monitoring party's cell phone, smartphone or mobile communication device and not on a remote server or intermediary server, the potential for a security breach from an outside party is greatly reduced.

3) Real-time monitoring—This technology enables the monitoring party to receive the text messages and alerts on their cell phone, smartphone or mobile communication device in near real-time (approximately at the time they occur on the child's cell phone, smartphone or mobile communication device) and without any additional latency (delays) introduced by a server-based architecture (i.e. two-tier architecture, client/server architecture).

In other words, no servers are needed to display the text messages provided by the real-time text message monitoring feature and alerts of such example run-time embodiments. Servers may be implemented to upload the application software (mobile app) or data to a mobile communication device, For example, uploading the most recent, up-to-date list of text strings, images, audio clips and video clips to the data structure or database containing targeted content. Servers may be implemented by services utilized, for which a specific non-limiting example is services of a cellular communications service provider or also known as wireless communications service provider (FIG. 1).

To further clarify this point, the application software, data, databases and signaling/control information for implementing the run-time aspect of such example embodiments is self-contained on the cell phones, smartphones or mobile communication devices themselves and does not rely on an external server to facilitate or provide any aspect of its specific application functionality.

The example application software only needs to reside on at least one monitored mobile communication device (cell phone) and one monitoring mobile communication device (cell phone) (in any suitable distribution) in order to provide the functionality of this technology, though it can reside on multiple devices if desired. In other words, the technology's application software preferably resides on a minimum of one cell phone (displaying the text messages, pictures, electronic communications and alerts, being monitored) and a minimum of one cell phone whose text messages are being monitored and forwarded to the cell phone that is doing the monitoring. The near real-time monitoring function in such example embodiments is implemented as a peer to peer network scheme (architecture) and does not require an intermediary server (e.g. application server) for executing its functionality for monitoring electronic communications (e.g. text messages) or providing alerts. In this context, the example application software operates in a peer to peer network scheme implementing direct node to node communication when issuing a command to transmit (forward) text messages or electronic communications from the monitored cell phone (mobile communication device) to the monitoring cell phone (mobile communication device) in contrast to a server-based network scheme whereby one or more cell phones (mobile communication devices) communicate with or transmit text messages or electronic communications to a computer server (that is not itself a cell phone, smartphone or mobile communication device). However, at least some embodiments may adopt some server based functionality.

Figure 4:
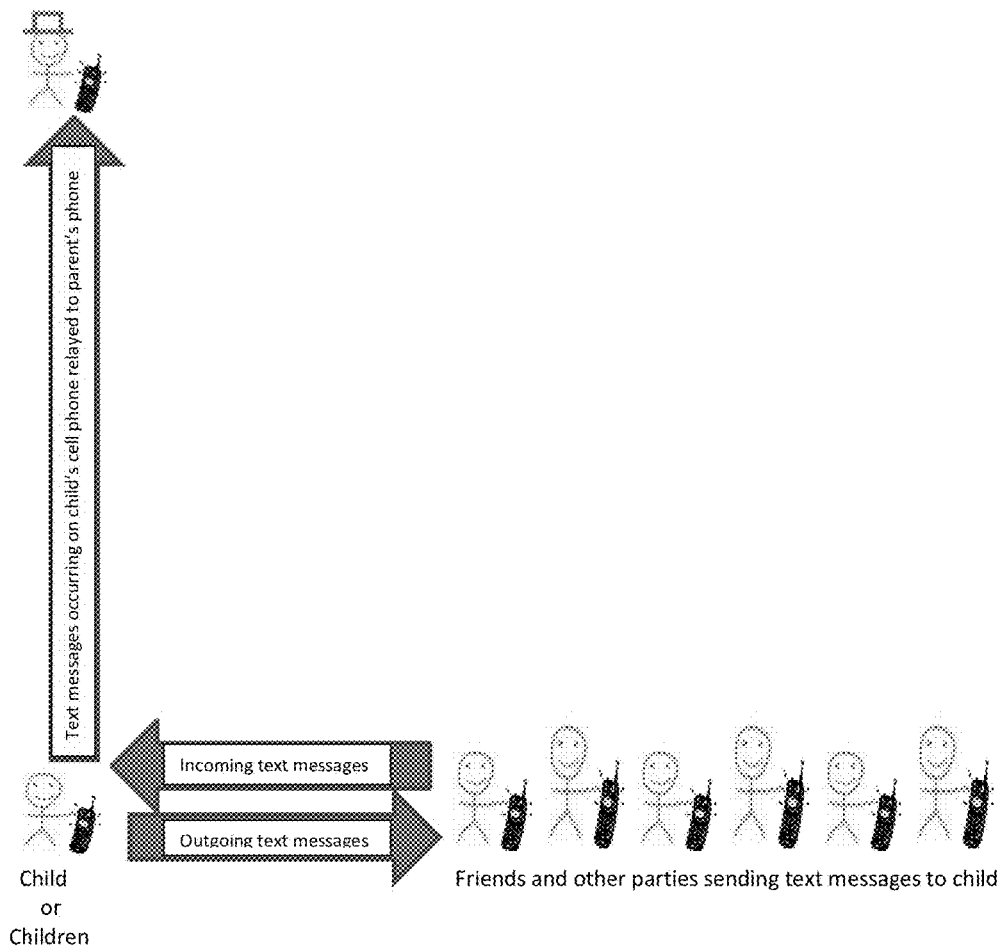
FIG. 4 is a depiction of an embodiment for a parent monitoring their child's/children's mobile communication device from their own mobile communication device by receiving copies of text messages coming into and going out of the child's mobile communication device. This embodiment could be viewed as a message forwarding scheme. More specifically, the software (mobile app) forwards incoming and outgoing text messages occurring on the child's mobile communication device to the parent's mobile communication device.

FIG. 4 shows a depiction of near real-time text message or SMS message monitoring for cell phones, smartphones or mobile communication devices. One example application may be a parent monitoring their child's/children's mobile communication device whereby the parent receives copies of text messages or SMS messages coming into (being received by) and going out (being transmitted out of) the child's mobile communication device. Such an embodiment may be viewed as a message forwarding scheme.

Another way to view this is that the software (mobile app) in this embodiment forwards incoming and outgoing text messages or SMS messages from the child's mobile communication device ("monitored device") to the parent's mobile communication device ("monitoring device"). All text messages (incoming & outgoing) occurring on the child's cell phone (mobile communication device) are relayed (forwarded) to the parent's cell phone (mobile communication device) by the example mobile app. The data (e.g., text messages to be monitored) preferably are stored on the child's and parent's cell phone and not on an intermediary or centralized server. The mobile app preferably is installed on the parent's cell phone (mobile communication device) and the child's cell phone (mobile communication device) and contains the execution code (i.e. software), database(s), libraries and data (including text messages and electronic messages) to perform all operations necessary to carry out the functionality of example methods.

Although not illustrated by FIG. 4, monitoring of more than one cell phone (mobile communication device) to be monitored can be done from the same mobile app. Additionally, more than one monitoring party can monitor the same child or children. For security purposes, optional authentication or registration may be performed on the monitoring party's cell phone or to register the monitoring party's cell phone to the monitored party's cell phone prior to any text messages being relayed (sent).

Although the above embodiment provides distinct advantages for many applications as discussed, in some other applications use of a cloud computing, grid computing, autonomic computing configuration or other types of network or computing schemes may be useful.

Figure 5:
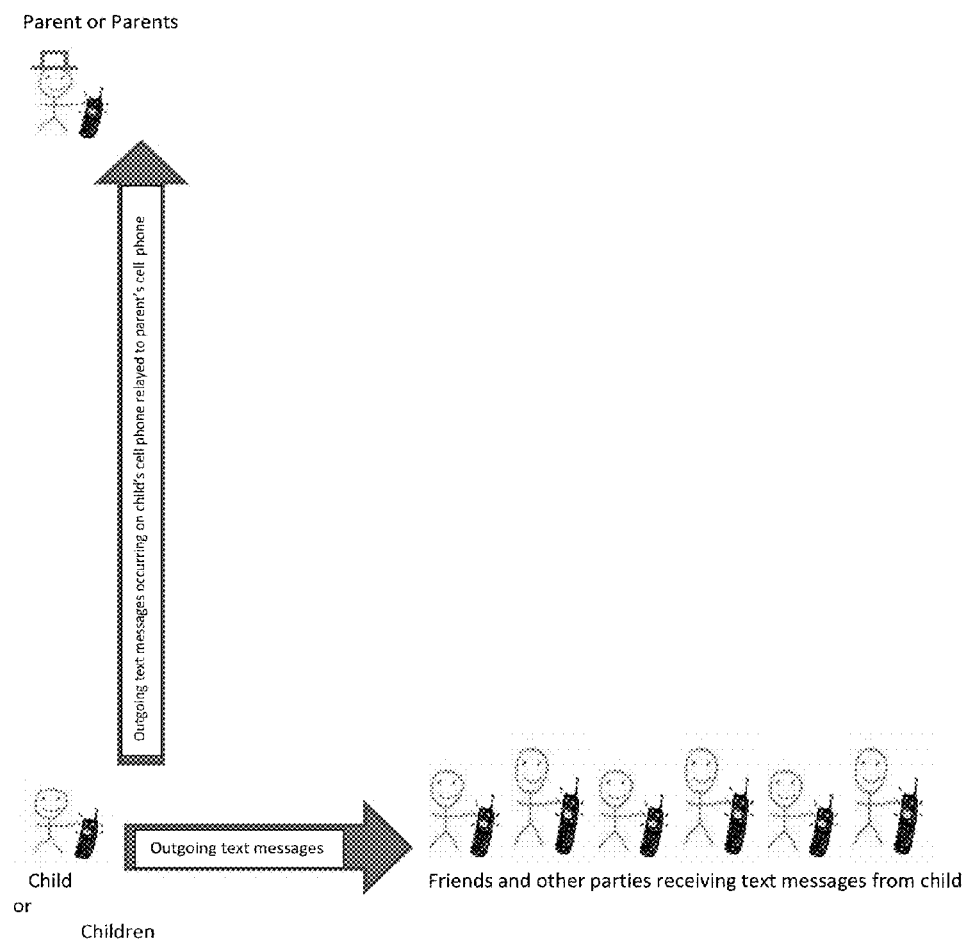
FIG. 5 is a depiction of an embodiment for a parent monitoring their child's/children's mobile communication device by receiving copies of text messages going out of the communication device. This embodiment could be viewed as a message forwarding scheme. More specifically, the software (mobile app) forwards outgoing text messages from the child's mobile communication device to the parent's mobile communication device.

FIG. 5 is a depiction of an embodiment for a parent monitoring their child's/children's mobile communication device by receiving copies of outgoing text messages or SMS being transmitted out of the communication device. This embodiment could be viewed as a message forwarding scheme. More specifically, the example software (mobile app) forwards outgoing text messages or SMS messages from the child's mobile communication device to the parent's mobile communication device. FIG. 5 illustrates near real-time SMS message (text message) monitoring for cell phones (e.g., "smartphones," or other mobile communication devices) of outgoing SMS messages (text messages), implemented as a peer-to-peer network architecture. All outgoing text messages occurring on the child's cell phone are relayed (sent) to the parent's cell phone by the mobile app. The data (text messages to be monitored) preferably are stored exclusively on the child's and parent's cell phone and not on an intermediary or centralized server. The example mobile app is installed on the parent's cell phone and the child's cell phone and contains the execution code, database, libraries and data (including text messages or electronic messages) to perform all operations necessary to carry out the functionality of some embodiment. Although not illustrated by this diagram, monitoring of more than one party's mobile communication device can be performed from a single monitoring mobile communication device. Additionally, more than one monitoring party's mobile communication device can monitor the same child's or children's mobile communication device (monitored mobile communication device). For security purposes, optional authentication or registration may be performed on the monitoring party's cell phone prior to any text messages or electronic messages being forwarded (transmitted).

Figure 7:
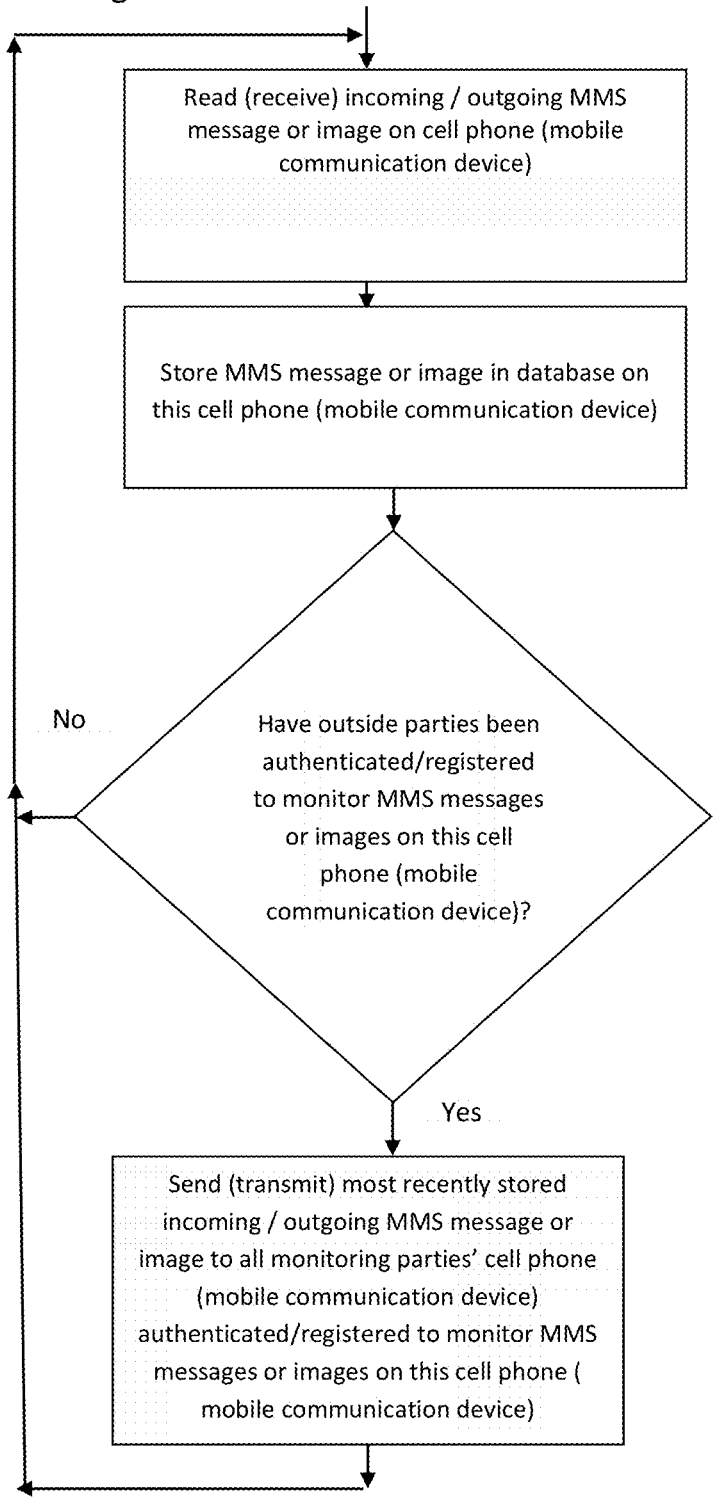
FIG. 7 is a flowchart illustrating an example process for providing copies of MMS communications from a mobile communication device being monitored to one or more mobile communication devices authenticated or registered to monitor such communications in accordance with some embodiments.
Figure 8:
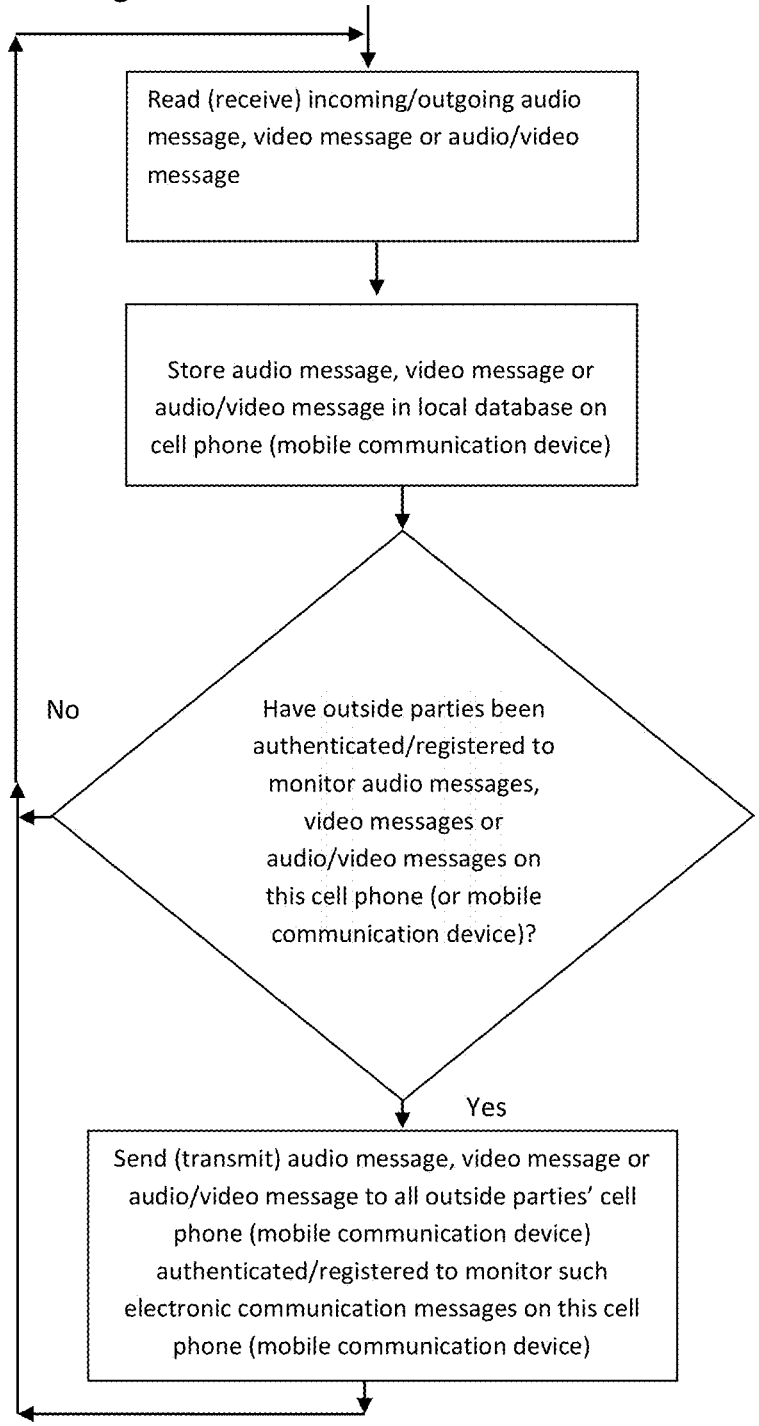
FIG. 8 is a flowchart illustrating an example process for providing copies of audio, video or audio/video communications from a mobile communication device being monitored to one or more mobile communication devices authenticated or registered to monitor such communications in accordance with some embodiments.
Figure 9:
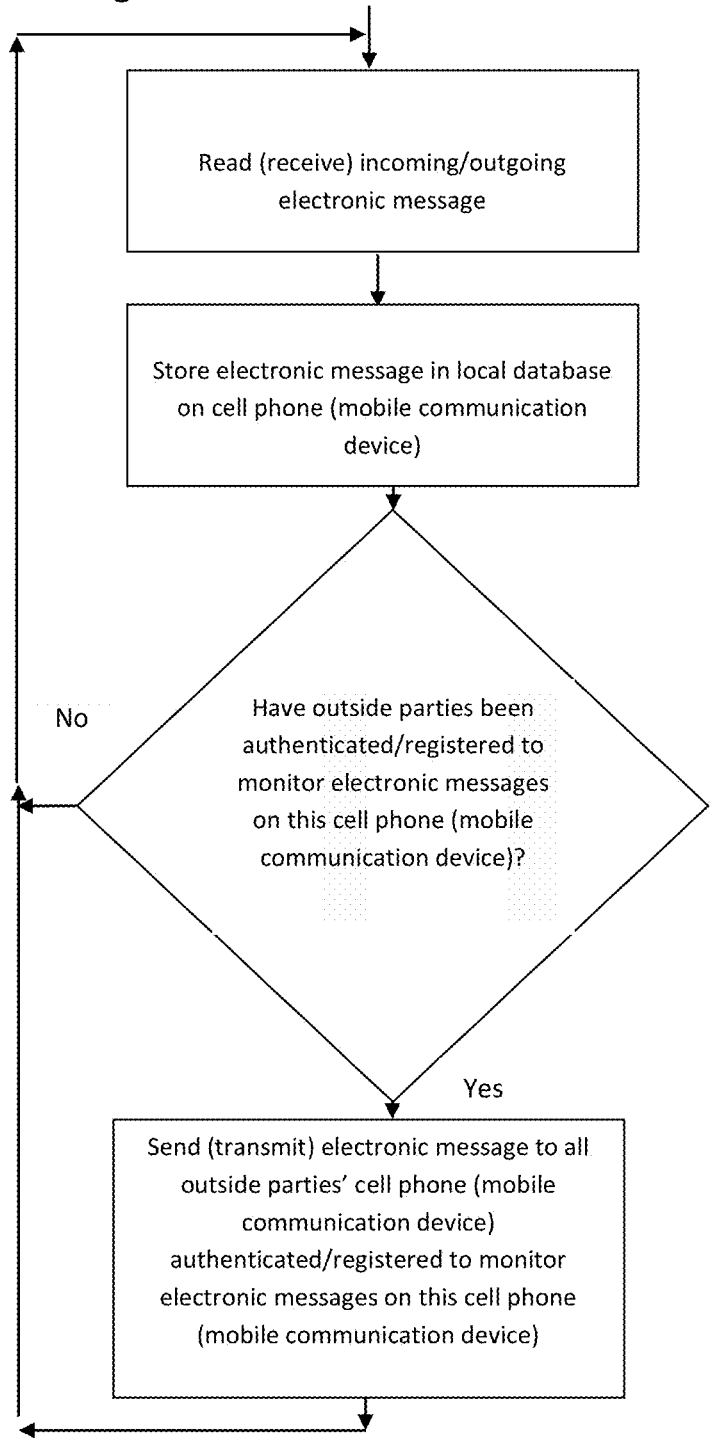
FIG. 9 is a flowchart illustrating an example process for providing copies of electronic messages from a mobile communication device being monitored to one or more mobile communication devices authenticated or registered to monitor such electronic messages in accordance with some embodiments.

Various example monitoring methods are shown in FIGS. 6-15. For instance, one particular example use for this technology, as a mobile application (mobile app), is to enable a parent to monitor the text messages occurring on their children's cell phones from their personal cell phone (e.g., FIG. 4). However, in addition to text message monitoring, this can enable the monitoring of other activities or features that can occur on a child's cell phone including but not limited to the monitoring of incoming and outgoing MMS messages (FIG. 7), images, audio messages, video messages, audio/video messages (FIG. 8) and other types of electronic messages (FIG. 9).

Other examples of monitoring functionality that this technology enables on cell phones, smartphones or mobile communication devices include, but are not limited to, cell phone conversations (voice phone calls) monitoring (monitoring cell phone numbers called/received), websites (URLs) visited, applications installed or uninstalled on a remote device, the turning on/off of the GPS or other location detecting technologies, features or services that may exist today or in the future on a remote cell phone (or communication device) to be used in identifying the location of the remote cell phone or communication device (e.g. to find the location of a child), other tracking features that can be used to proactively alert parents when a child travels beyond certain geographical boundaries or predefined limits related to geographical position and any or all statistics or metrics related to the aforementioned functions or any other functions that can be monitored on a cell phone, smartphone or mobile communication device. Some examples of statistics include: the number of text messages received from a particular contact, the number of text messages sent to a particular contact, which contacts communicated to the most to the child's cell phone (smartphone), the number of new contacts made during a particular timeframe, how many times a child left and entered a particular geographic zone (i.e. residence) and the associated dates and times, the number of times a particular website was visited, the number of new websites visited in a particular timeframe, and others.

Figure 6:
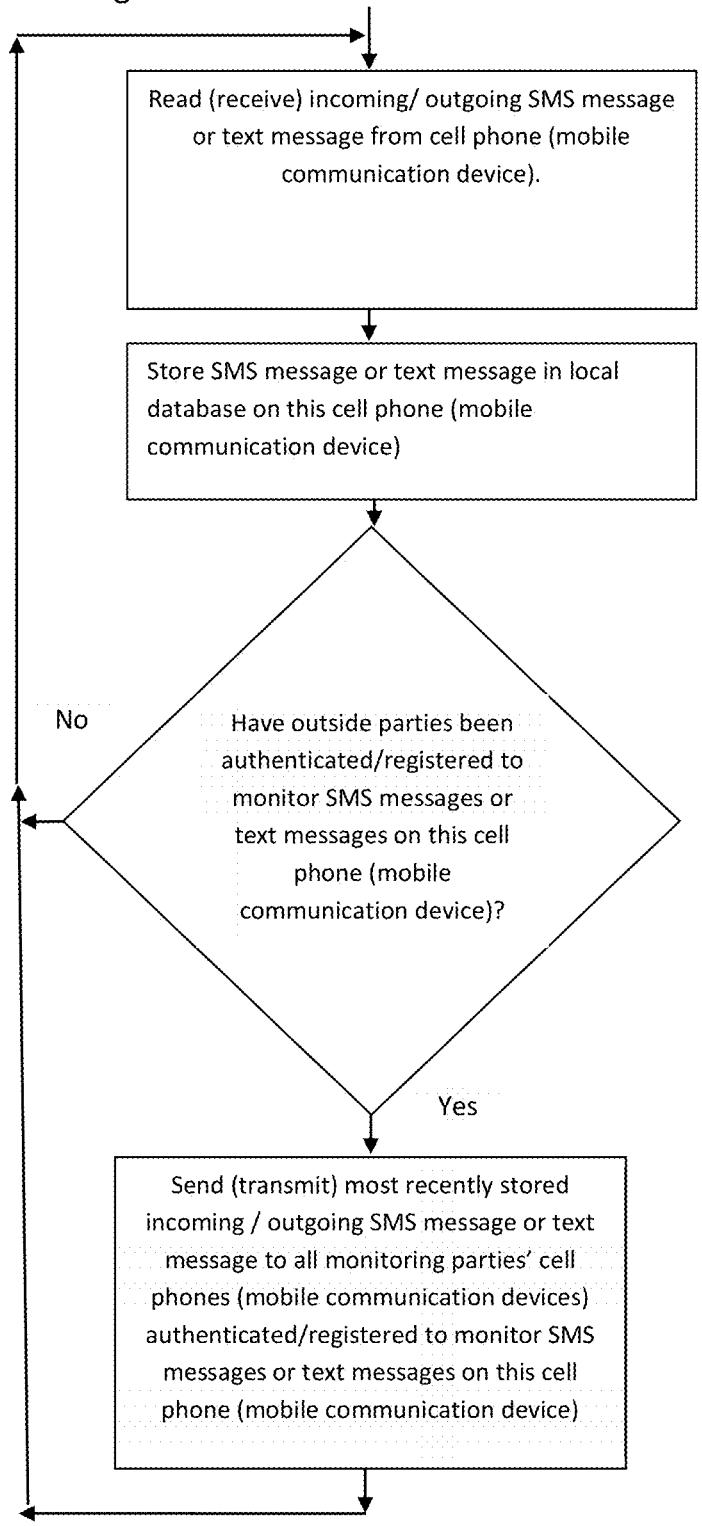
FIG. 6 is a flowchart illustrating an example process for providing copies of SMS communications from a mobile communication device being monitored to one or more mobile communication devices authenticated or registered to monitor such communications in accordance with some embodiments.

Particular example embodiments provide the near real-time monitoring of text messages, SMS or MMS messages from a third party cell phone (the monitoring cell phone) for all incoming and outgoing text messages, SMS or MMS messages occurring on a designated cell phone to be monitored (the remote cell phone) and any other mobile communication devices such as a smartphone, PDA, tablet PC or computer that can transmit and receive text messages, electronic messages, SMS or MMS messages via cellular technology, Internet technology or other types of data communication technologies that enable computers or mobile communication devices to communicate and share data existing today or in the future, as shown in FIGS. 4, 6, and 7.

FIG. 6 is a flowchart illustrating an example process for providing copies of SMS or text message communications from a mobile communication device being monitored to one or more mobile communication devices optionally authenticated to monitor such communications in accordance with some embodiments.

FIG. 7 is a flowchart illustrating an example process for providing copies of MMS communications or images from a mobile communication device being monitored to one or more mobile communication devices optionally authenticated to monitor such communications in accordance with some embodiments.

FIG. 8 is a flowchart illustrating an example process for providing copies of audio, video or audio/video communications from a mobile communication device being monitored to one or more mobile communication devices optionally authenticated to monitor such communications in accordance with some embodiments.

FIG. 9 is a flowchart illustrating an example process for providing copies of any electronic message from a mobile communication device being monitored to one or more mobile communication devices optionally authenticated to monitor such electronic messages in accordance with some embodiments.

Figure 10:
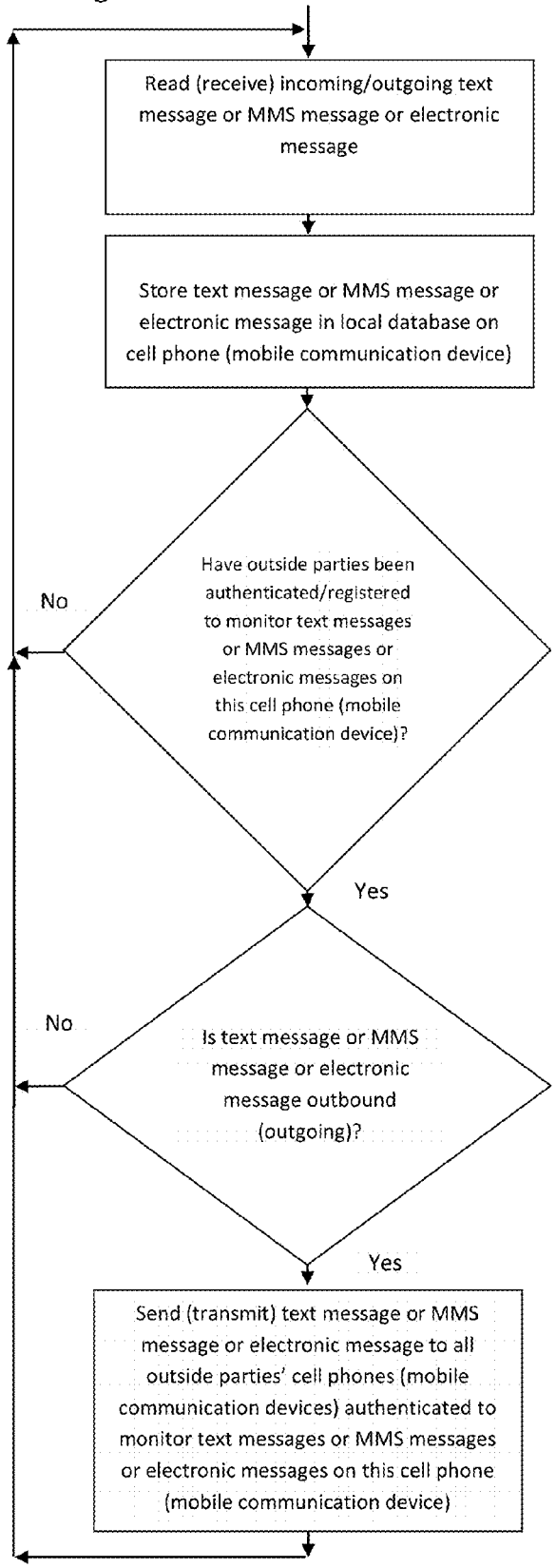
FIG. 10 is a flowchart illustrating an example process for providing copies of outgoing SMS, MMS or any electronic message from a mobile communication device being monitored to one or more mobile communication devices authenticated or registered to monitor such communications in accordance with some embodiments.
Figure 11:
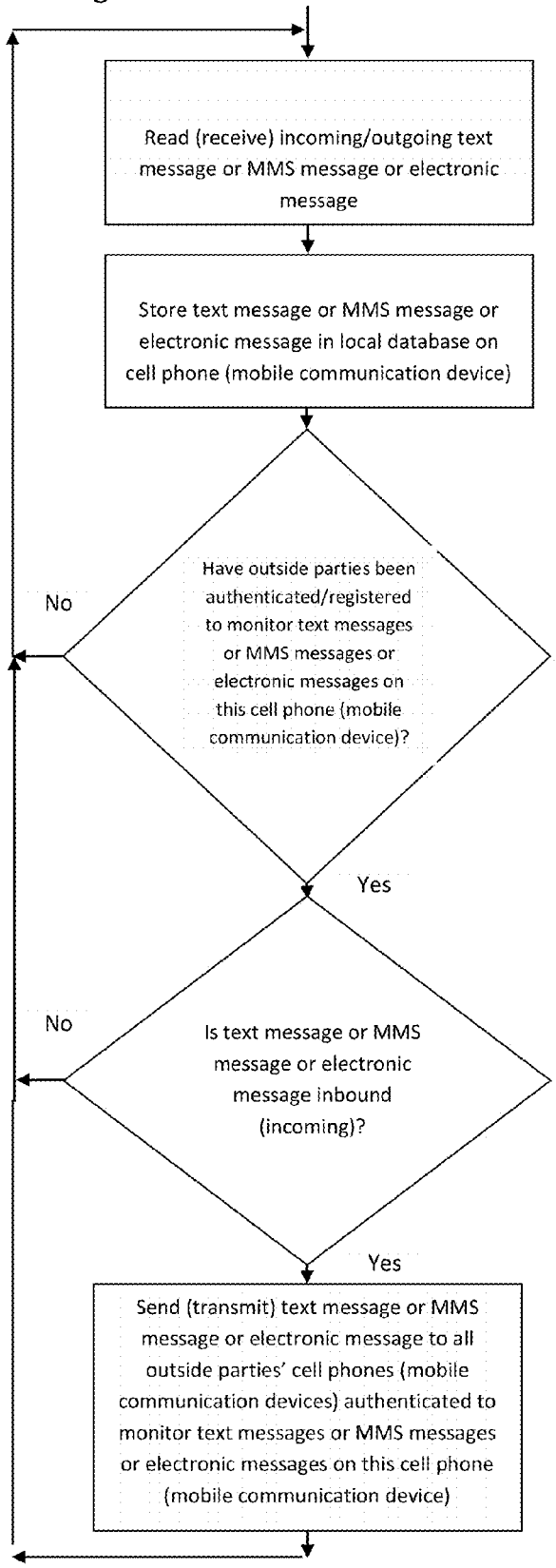
FIG. 11 is a flowchart illustrating an example process for providing copies of incoming SMS, MMS or any electronic message from a mobile communication device being monitored to one or more mobile communication devices authenticated or registered to monitor such communications in accordance with some embodiments.

Another embodiment provides a method for transmitting only the incoming text messages, SMS, MMS messages or any type of electronic message communication occurring on one or more mobile communication devices being monitored (e.g. child's cell phone) to a monitoring mobile communication device (FIG. 11). One example use would be for a parent to be able to monitor from their smartphone, text messages their child is receiving on their smartphone from one or more parties. FIG. 11 is a flowchart illustrating an example process for providing copies of incoming text messages, SMS, MMS or any electronic message communications from a mobile communication device being monitored to one or more mobile communication devices optionally authenticated to monitor such communications in accordance with some embodiments. FIG. 10 is a flowchart illustrating an example process for providing copies of outgoing text messages, SMS, MMS or any electronic message communication from a mobile communication device being monitored to one or more mobile communication devices optionally authenticated to monitor such communications in accordance with some embodiments. One example use would be for a parent to be able to monitor from their smartphone, text messages their child is transmitting on their smartphone to one or more parties.

Figure 12:
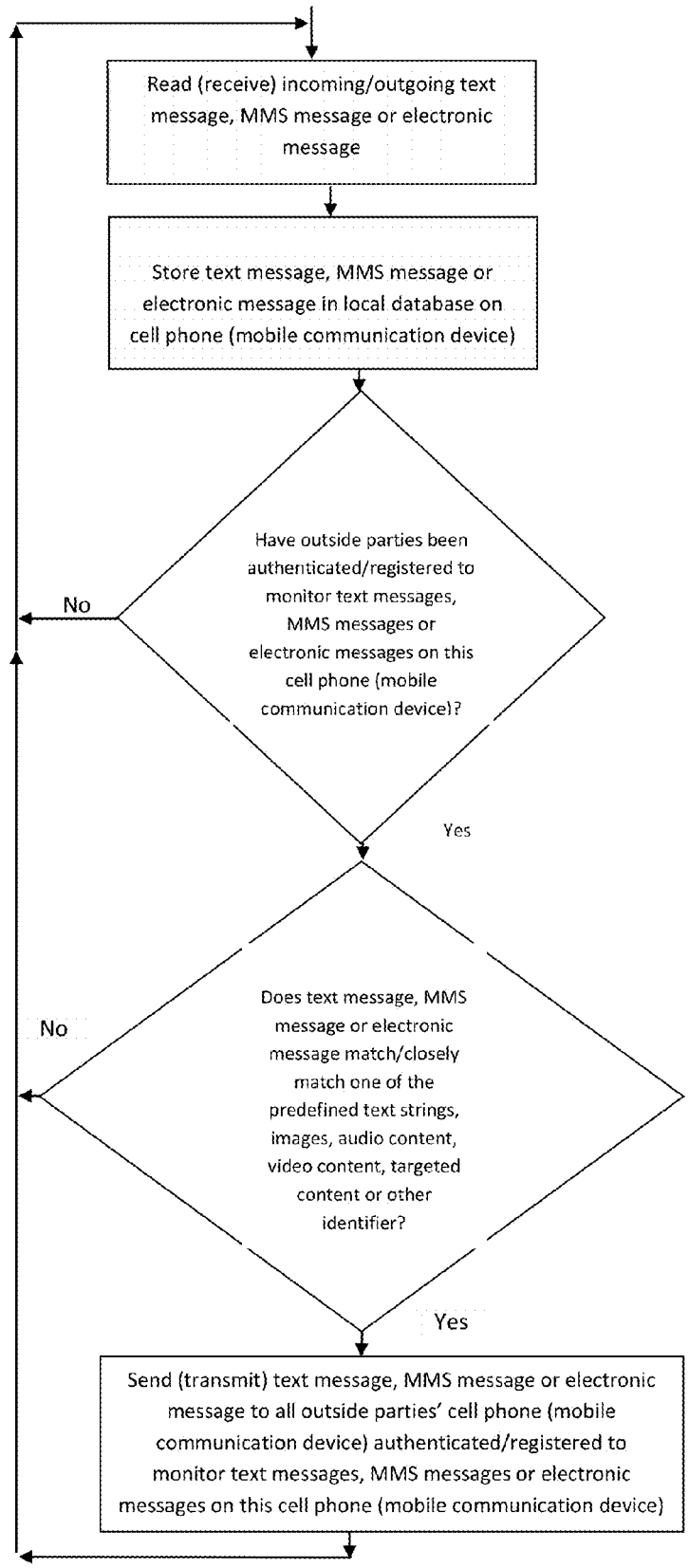
FIG. 12 is a flowchart illustrating an example process for providing copies of incoming SMS, MMS or any electronic message communications, based on certain conditions being met, from a mobile communication device being monitored to one or more mobile communication devices authenticated or registered to monitor such communications in accordance with some embodiments.

Another embodiment of this technology provides a method for transmitting only the incoming and/or outgoing text messages, SMS, MMS, images, audio clips, video clips, audio/video clips or electronic messaging from a mobile communication device being monitored to monitoring mobile communication devices that have/include a word, text string, image, image snippet, audio clip, video clip or other identifier that has been predefined or is target content (FIG. 12). FIG. 12 is a flowchart illustrating an example process for providing copies of text messages, SMS, MMS, images, audio clips, video clips or any electronic message communications, based on certain conditions being met, from a mobile communication device being monitored to one or more mobile communication devices optionally authenticated to monitor such communications in accordance with some embodiments. One example use of this embodiment is to enable a parent to received copies of text messages, SMS, MMS, images, audio, video or other electronic messages that match or have a close proximity match to targeted words, text strings, acronyms, short hand, codes, images, image snippets, audio, video or other identifiers. This allows a parent to judiciously monitor their children's electronic messaging content only when there are reasonable grounds or probably cause.

Figure 13:
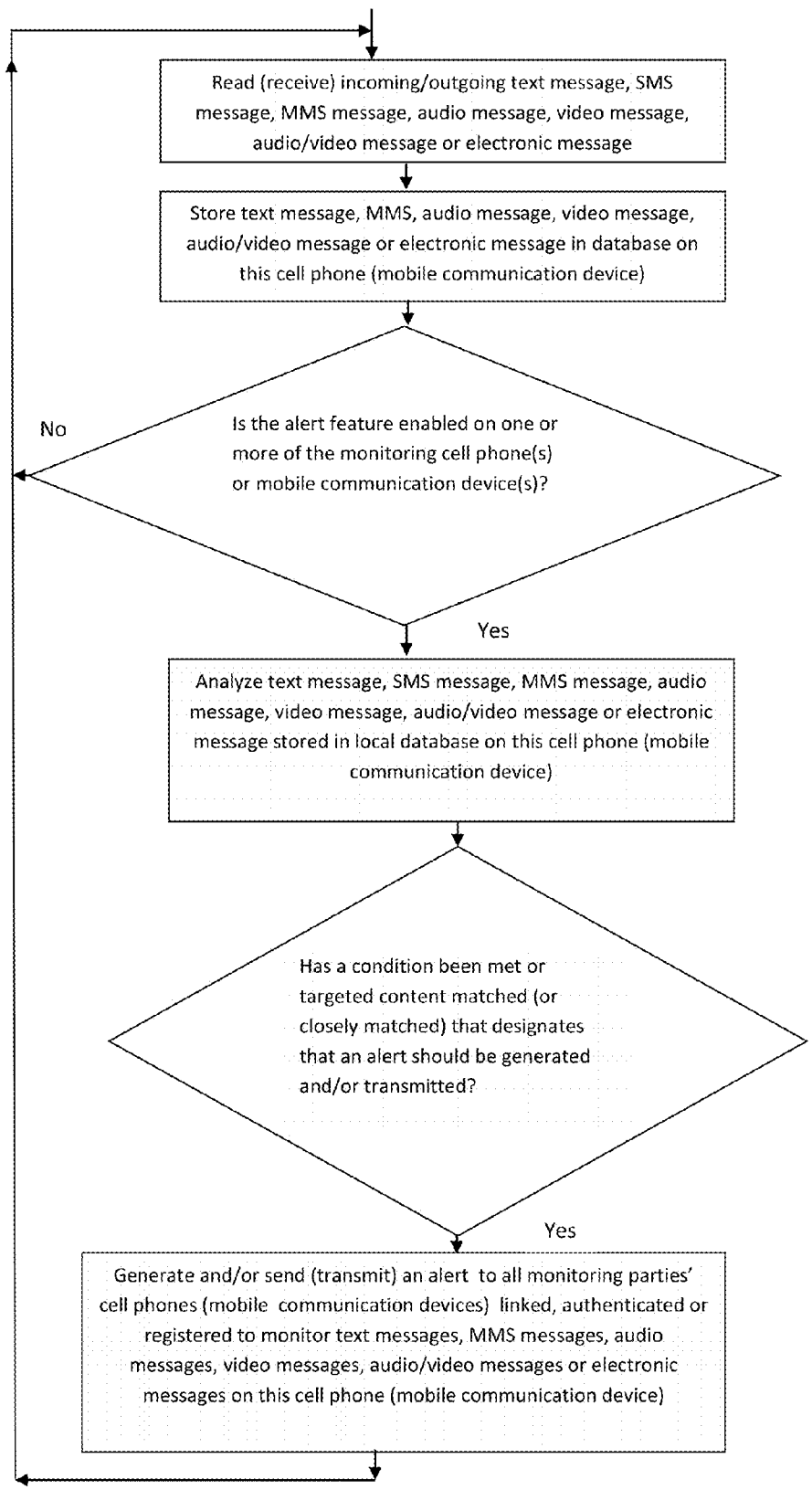
FIG. 13 is a flowchart illustrating an example process for generating alerts (warnings) for one or more mobile communication devices authenticated or registered to monitor communications on the mobile communication device being monitored when certain conditions have been met or target content has been matched to, based on predefined data/content stored in a data structure or database (Target Element Data) on either the monitoring or monitored mobile communication device in accordance with some embodiments.

Alerts can optionally be generated and displayed on the Monitoring Party's mobile communication device (cell phone) indicating that a match or close proximity match was detected based on the comparison of the communication content to the predefined words, text strings, acronyms, short hand, codes, images, image snippets, audio, video, audio/video or other identifiers (FIG. 13). FIG. 13 is a flowchart illustrating an example process for transmitting alerts (warnings) to one or more mobile communication devices optionally authenticated to monitor communications on the mobile communication device being monitored when certain conditions have been met based on predefined data stored (Stored Elements) or targeted content has been matched or reasonably matched (close proximity match) in a local data structure or database on the mobile communication device being monitored or the monitoring mobile communication device, which is in accordance with some embodiments.

Figure 14:
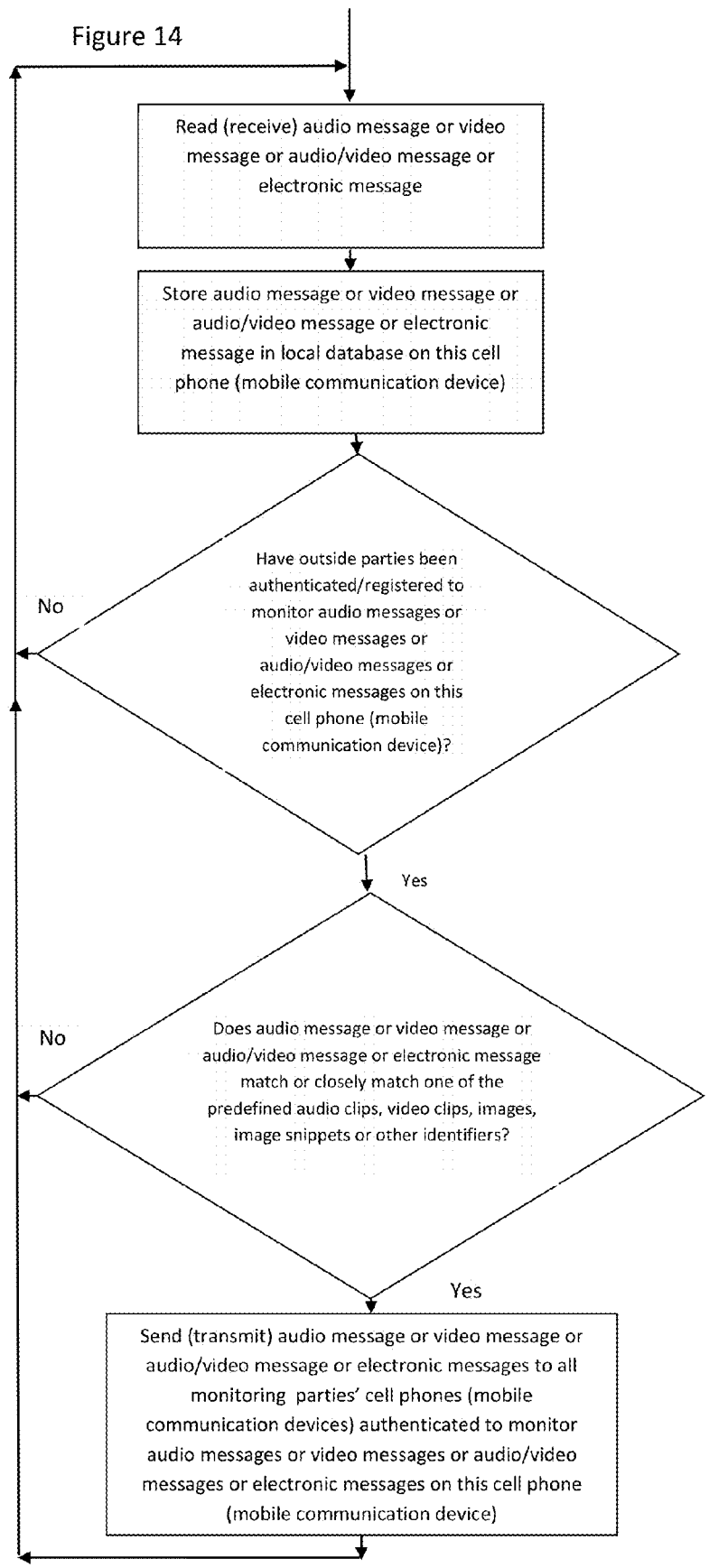
FIG. 14 is a flowchart illustrating an example process for providing copies of incoming audio communications, video communications or audio/video communications based on certain conditions being met, target content being matched to or target content having a close proximity match to predefined data/content stored in a data structure or database from a mobile communication device being monitored to one or more mobile communication devices authenticated to monitor such communications in accordance with some embodiments.

Another embodiment of this technology provides a method for transmitting incoming and/or outgoing voice/audio content or clips that match or reasonably match (close proximity match) a predefined audio content/clip (targeted content) stored in a library or database (FIG. 14). FIG. 14 is a flowchart illustrating an example process for providing copies of incoming audio communications (message) or video communications (message), based on certain conditions being met, from a mobile communication device being monitored to one or more mobile communication devices optionally authenticated to monitor such communications in accordance with some embodiments.

One example use of this embodiment is to enable a parent to monitor voice/audio calls for selected words, sounds or other audio identifiers. This allows a parent to monitor their children's phone (audio) conversations by receiving specific audio clips, words, sounds, or other audio identifiers that match those that were predefined, when they occur on their children's cell phone(s) or mobile communication device. Alerts can also be sent to the monitoring party's cell phone or mobile communication device indicating that a match or close proximity match has occurred.

Figure 15:
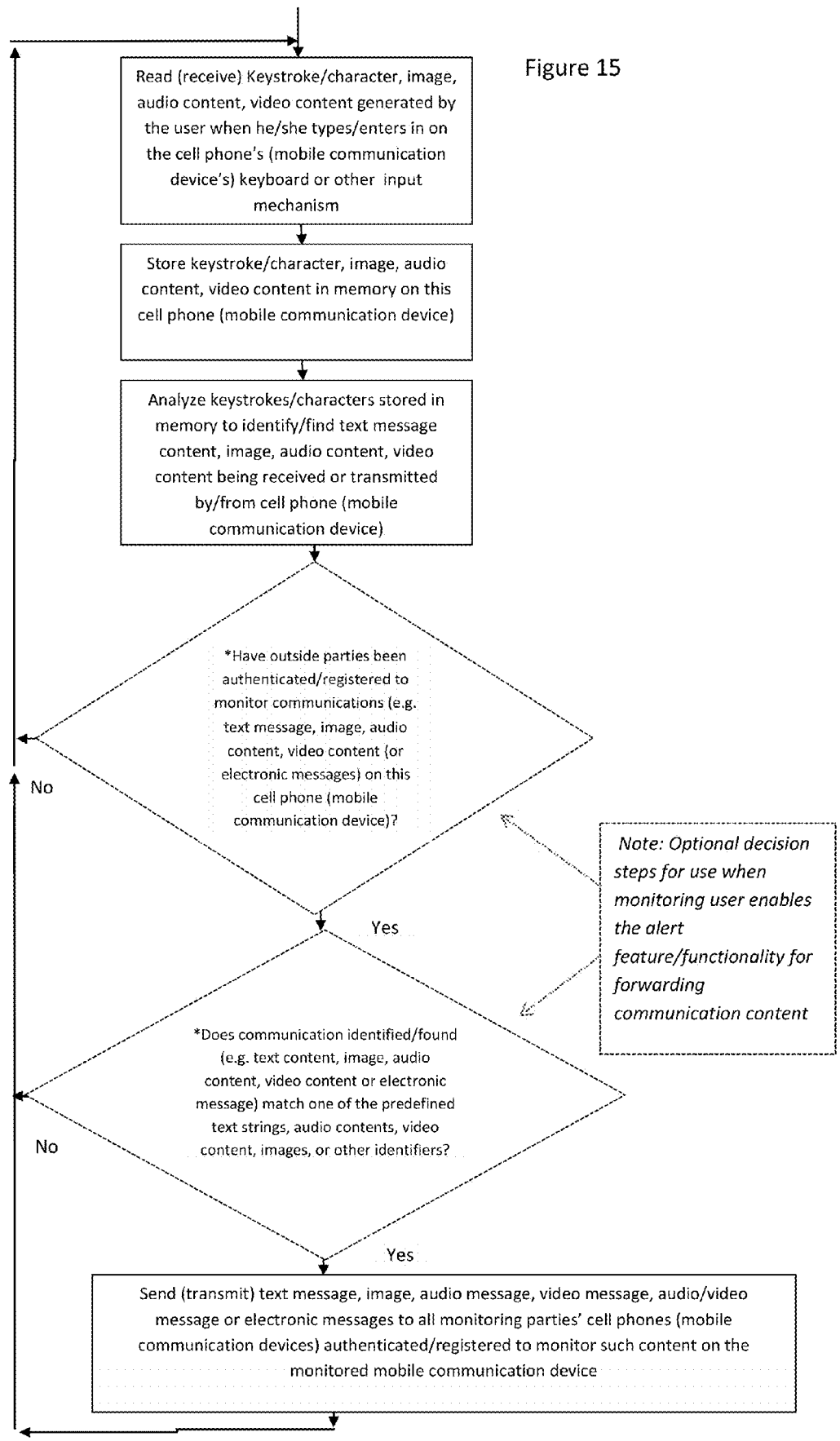
FIG. 15 is a flowchart illustrating an example process for providing copies of all keystrokes or characters entered in or images created (i.e. pictures from camera feature on mobile device) on a mobile communication device being monitored by one or more mobile communication devices authenticated or registered to monitor such keystrokes and images in accordance with some embodiments.

FIG. 15 is a flowchart illustrating an example process for providing copies of all keystrokes or characters entered in (e.g., text message), images, audio, video, audio/video or multimedia message created (e.g. pictures from camera feature on mobile a device) on a mobile communication device being monitored by one or more mobile communication devices optionally authenticated to monitor such keystrokes, characters, images, audio content, video content, audio/video content or multimedia messages in accordance with some embodiments.

Figure 16:
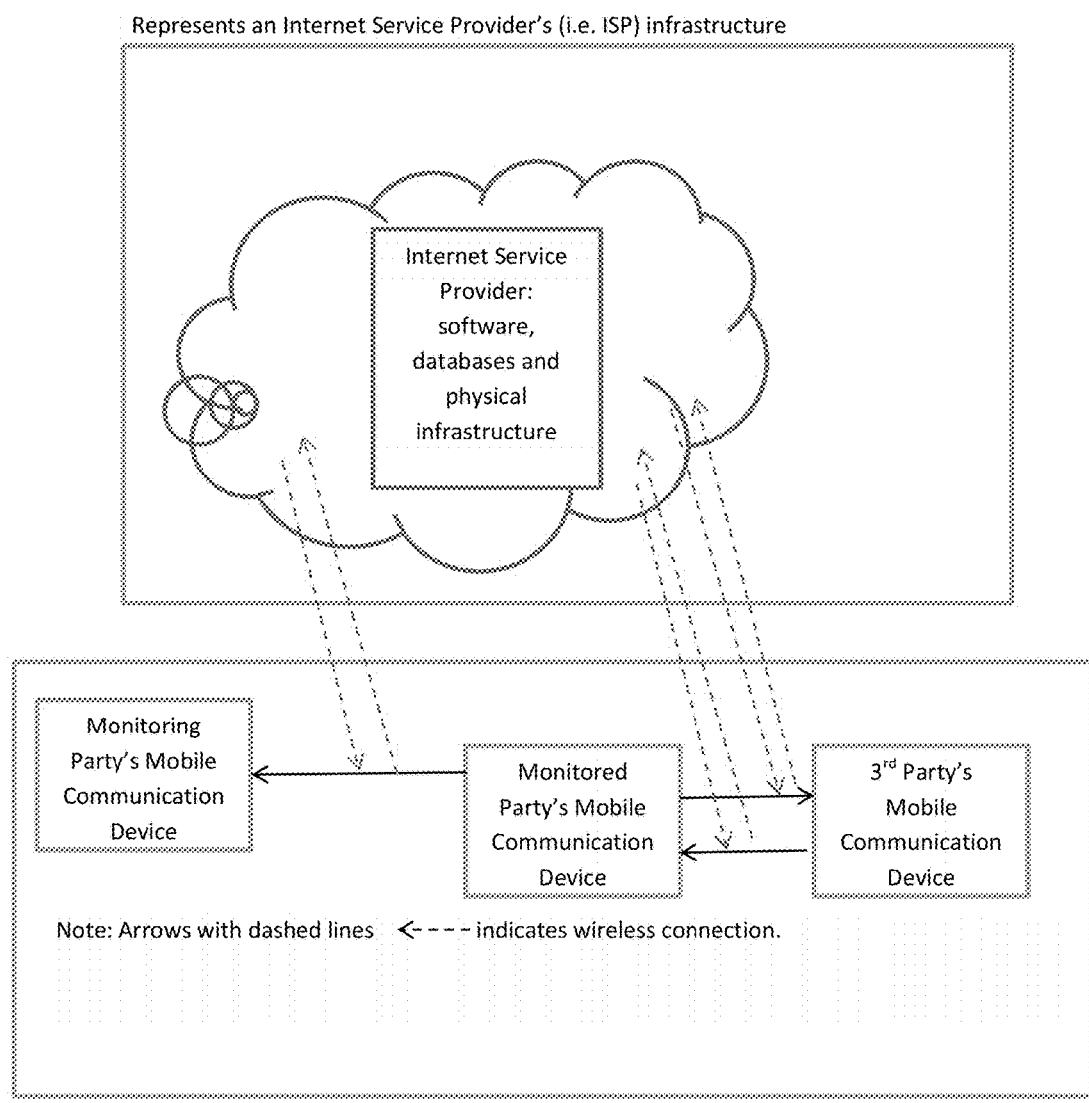
FIG. 16 is a schematic diagram of an embodiment for facilitating wireless communication among communication devices, in accordance with some embodiments, including communications through the Internet via a Wi-Fi, Bluetooth or other wireless technology connection.

FIG. 16 is a schematic diagram of an embodiment for facilitating wireless communication among communication devices, in accordance with some embodiments. In particular with this example, communications can be through the Internet via a Wi-Fi, Bluetooth or other wireless technology connection.

Figure 17:
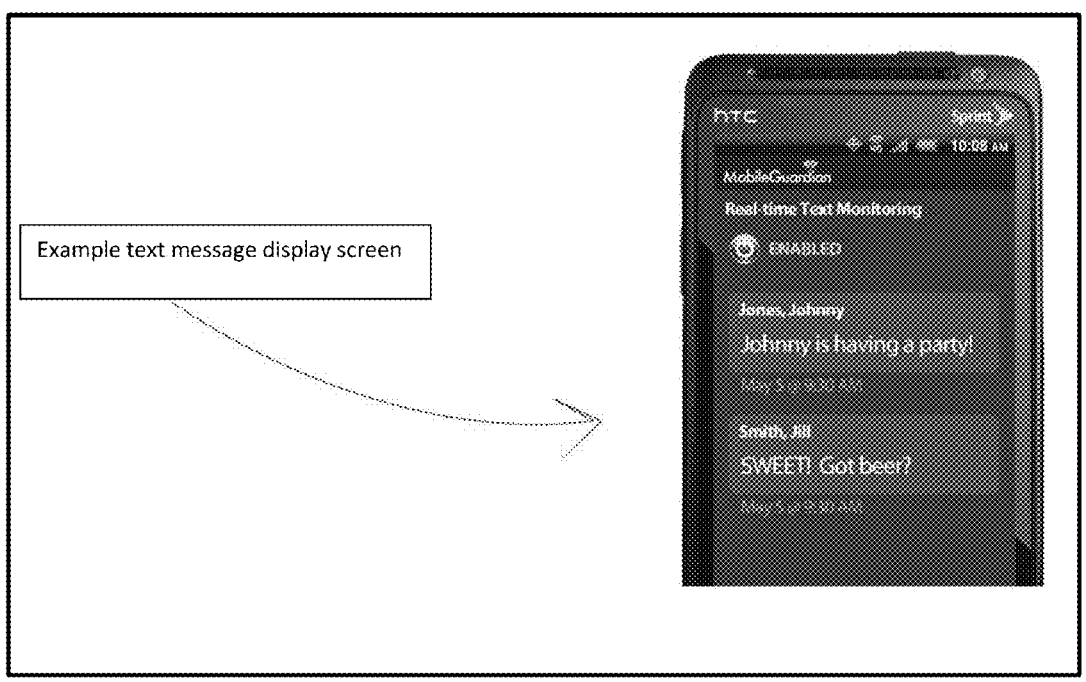
FIG. 17 is an example of a user interface that may be incorporated on the monitoring cell phone, smartphone or mobile communication device to enable the monitoring user to view, in the case of firmware, text messages or SMS that have occurred on the monitored user's cell phone, smartphone or mobile communication device, and are about to occur (past and present).

FIG. 17 is an example of a user interface that may be incorporated on the monitoring cell phone, smartphone or other mobile communication device to enable the monitoring user to view, in the case of firmware, text messages or SMS that have occurred on the monitored user's cell phone, smartphone or mobile communication device, and are about to occur (past and present). That is, if a monitoring user opened this user interface on their mobile communication device on a specific day, a copy or log of all text messages, for example, from the previous day's communication on the monitored user mobile communication device would be accessible by scrolling backwards on the interface. Additionally and following this logic, other past day's text messages or SMS (2 days previous, 3 days previous and so on) would be accessible by the monitoring user on this user interface. In another instance of this example, if a new text message or SMS is generated by the monitored user while the monitoring user is on/viewing this example user interface, then the new text message or SMS would be displayed in near real-time on the user interface (in chronological order with the other text messages or SMS). Therefore, the user would see the text message or SMS appear on the user interface in near real-time as it was generated on the monitored user's cell phone, smartphone or mobile communication device.

A text message or SMS displayed on this example user interface could optionally include all information that a typical text message or SMS would make available to software or a mobile application (mobile app) such as time and date stamp of when it was received or transmitted on/from the monitored user interface, the phone number or user identification number of the monitored user's or one or more $3^{rd}$ party cell phones, smartphones or mobile communication devices involved in the communication and any other information pertinent or available from the message, from the messaging service providing the text message or SMS or information related to the message. Additionally, this example user interface would allow a pre-determined total number of text messages or SMS to be stored for display (viewing may be implemented by enabling scrolling backwards and forward on the user interface) and in this example, the software would either rewrite over the oldest message when the storage limit was achieved by implementing a circular buffer technique or would generate a warning message to the monitoring user's cell phone, smartphone or mobile communication device indicating that the text message or SMS log was full and that it should be cleared or individual messages of the choice of the user should be deleted to make room for new, incoming text messages or SMS.

Figure 18:
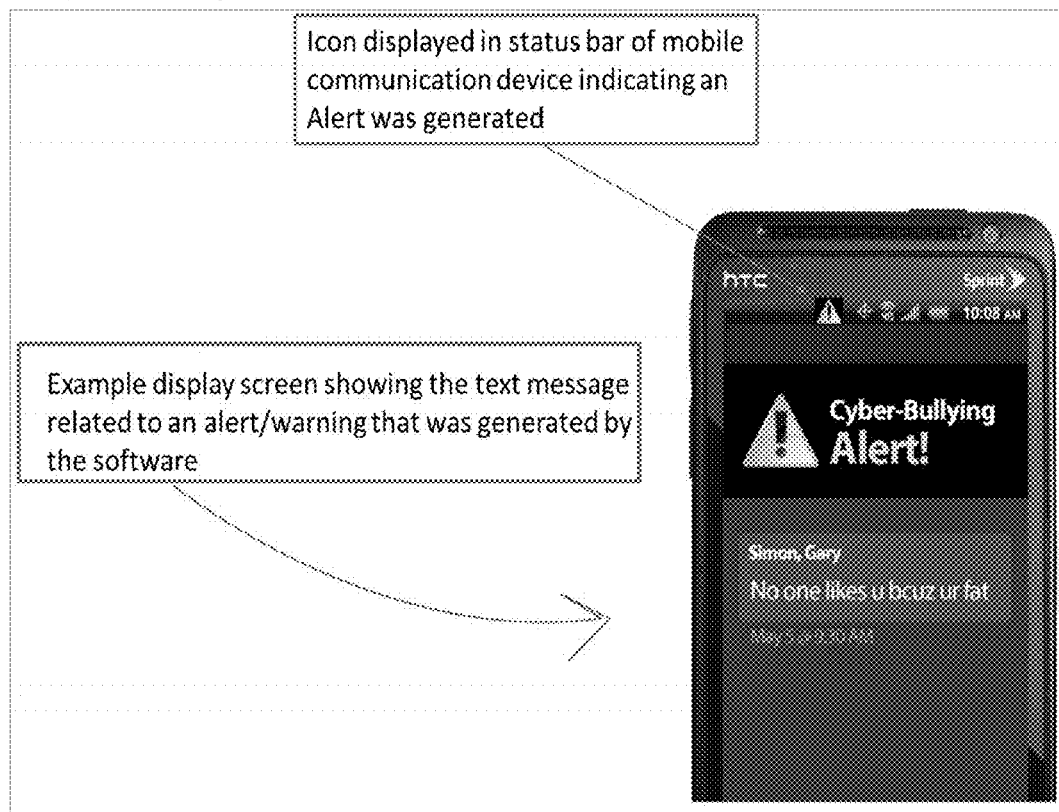
FIG. 18 is an example of a user interface that may be incorporated on the monitoring cell phone, smartphone or mobile communication device for displaying a text message or SMS that is associated with an alert (or warning) that was generated by the software because it detected targeted content (e.g. possible inappropriate content) that occurred on the monitored user's cell phone, smartphone or mobile communication device.

FIG. 18 is an example of a user interface that may be incorporated on the monitoring cell phone, smartphone or mobile communication device for displaying a text message or SMS that is associated with an alert (or warning) that was generated by the software because it detected targeted content (e.g. possible inappropriate content) that occurred on the monitored user's cell phone, smartphone or mobile communication device. In this example, the alert causes at least 2 actions to occur on the monitoring user's cell phone, smartphone or mobile communication device. 1) It enables the monitoring user to open up or invoke a user interface, like the example user interface (FIG. 18), that will display the text message or SMS that the software matched or determined was a close proximity match to target content stored in a local database on either the monitored user's cell phone, smartphone or other mobile communication device or on the monitoring user's cell phone, smartphone or other mobile communication device; 2) The software will display an alert that would attempt to capture the attention of the monitoring user to make he/she aware that a warning (alert) has occurred. This alert could be displayed, for example, as an icon on the status bar of the primary user interface of a cell phone, smartphone or other mobile communication device (FIG. 18) or it could be in the form of a text message, pop up message, audio message, image message, instant message or other type of message that would attempt to gain the attention of the monitoring user when they looked at the display of or used their cell phone, smartphone or other mobile communication device.

Example embodiments of the near real-time electronic messaging (with an example being text messaging) monitoring feature disclosed herein provide, among other things, a method for monitoring text messages or SMS occurring on one or more monitored mobile communications devices (with examples including, but not limited to, tablet PCs, laptops, gaming devices, music players, PDAs, mobile communication devices, smartphones, cell phones (e.g. children's cell phones)) by another party's monitoring mobile communications device (e.g. parental cell phone).

Other embodiments provide a method for transmitting incoming and/or outgoing video content or clips that match or reasonably match (close proximity match) a predefined video content/clip stored in a library or database on either the monitored or monitoring mobile communication device. One example use of such embodiments is to enable a parent to monitor video content for selected images, moving pictures or other video identifiers. This allows a parent to monitor incoming and outgoing video content occurring on their children's cell phone(s). Alerts can also be sent to the monitoring party's cell phone indicating when a match or close proximity match has occurred. Once the alert is recognized by the parent, they can watch the actual video content that triggered the alert from the convenience of their own cell phone or mobile communication device. In such embodiments, video content may include the audio content accompanying the video whereby either the video content and/or the audio content (similar to the method in the previous provision that monitors audio phone conversations), can be monitored for generating alerts.

Still other embodiments provide a method for transmitting only the incoming and/or outgoing text messages to a third party cell phone that are associated with one or more preselected contacts (contact names) and/or phone number(s) and/or other communicating identifier by the monitoring party (e.g. parent or guardian). This enables a parent to limit the text messages being monitored based on certain contact(s) and/or phone number(s) that they preselect.

Other example embodiments provide a method for alerting the monitoring cell phone(s) when potentially inappropriate, illegal or targeted content is detected within a text message, SMS, MMS, audio message (words communicated through voice), audio/video message, video, images, or electronic message or during a phone (audio) conversation. This includes words, acronyms, short hand, codes, audio clips, voice excerpts, sounds, images, image snippets or other identifiers that are, or are known to have meaning that may be considered inappropriate or illegal or defined as targeted content. The application software running on the monitored device (e.g., cell phone) can have a library of words, acronyms, short hand, codes, images, image snippets, audio clips, voice excerpts, video and other identifiers stored in a database that may be illegal or considered inappropriate by a parent, guardian or society. When this type of inappropriate content is detected by the application software running on one or more of the cell phones being monitored, an alert is sent to the monitoring device (e.g., see FIG. 13) for notification purposes.

One intended use for this embodiment is to notify the user of the monitoring device, in near real-time, that the user of the monitored device may be engaged in or was engaged in inappropriate or illegal electronic communications (e.g. text message, MMS, audio message (words communicated through voice), audio/video message or electronic message). Updates to the database (library) of words, acronyms, short hand, codes, images, image snippets, audio clips, voice excerpts, video and other identifiers are (or can be) provided to the end users as part of a service model for this technology and are uploaded to the database on the monitored device (e.g., cell phone) periodically.

In example embodiments herein, the method in which these alerts are executed during run-time is in a peer to peer scheme (i.e. peer to peer network architecture). That is the library of inappropriate words, acronyms, short hand, codes, images, image snippets, audio clips, voice excerpts, video and other identifiers ("Watch Words") and also taught herein as targeted content is stored on the cell phone, smartphone or mobile communication device directly. In addition, the mobile app software that evaluates the Watch Words or targeted content and receives and displays alerts is stored on the Monitored Party's or Monitoring Party's cell phones (mobile communication devices) and not on any other intermediary server.

Another embodiment is a method for monitoring electronic communications comprising the steps of:
Receiving or communicating a first electronic message from or to a third party with a first mobile communications device;
using a first application stored on the first communications device to monitor and store the first message;
using the first application to communicate a second message that is a copy of the first message or includes information describing at least some aspect of the first message to a second application that is stored on a second mobile communications device; and, using the second application to receive the second message and to display the information.

Still another embodiment is a method for monitoring electronic communications on a mobile communication device by reading the characters, text strings, images, audio and videos generated by the user ("Input Elements") and then, analyze and compare the Input Elements to or against predefined text strings, images, audio content, audio/video content and/or videos stored in a local data structure or database. In contrast to SMS and MMS communications which utilize a wireless communications provider's network (cellular network) for transmitting and receiving communications and may use the mobile communication device's (smartphone) operating system and communication buffers (i.e. SMS buffer or MMS buffer) to facilitate the occurrence of a SMS message or MMS message (for example, an interrupt generated by the operating system to tell the software/app that a new SMS message was received) and the replication of such a SMS message or MMS message (for example, the copying of a SMS message from a communication buffer (SMS buffer) to a database). In contrast, this embodiment enables the monitoring of communications to/from messaging applications (i.e. mobile apps that incorporate SMS-like functionality, MMS-like functionality or both), also referred to as Mobile Messaging Apps, that currently utilize Wi-Fi, Bluetooth or other wireless technology to connect a smartphone or mobile communication device to the Internet to transmit and receive text messages, images, audio content, audio/video content, electronic messages and videos. Example mobile apps for this are, but not limited to, WhatsApp, MessageMe, KiK, TextNow, WeChat.

Input Elements include user interactions on a mobile communication device that include, but are not limited to, entering in characters on a keyboard, on-screen keyboard or voice recognition mechanism or depressing icons on a mobile communication device that activate a picture/image to be taken and/or audio/video to be captured. In one circumstance, the input/output buffers associated with the mobile communication device's operating system is not utilized for transmitting and receiving messages, images and videos, the application software is required to analyze the users input entered in on the mobile communication device to determine the communication being transmitted. For example, this could be a text message, image, audio clip, audio/video clip, electronic message or video being transmitted over the Internet via a Wi-Fi, Bluetooth or other wireless technology connection. After analysis is performed, the communication is compared to a predefined database or data structure of text strings, images, audio clips, video clips or target content ("Target Element Data") stored on the Monitored Party's or Monitoring Party's mobile communication device (FIG. 3). The comparison to the Target Element Data may also occur on the monitoring data communication device in addition to the Target Element Data being stored on the monitoring data communication device. Provided there is a match or a close proximity match, then the communication and/or associated alert (warning) is transmitted to the mobile communication devices optionally authenticated or registered to monitor such communications. Further, the software may obtain information about applications (mobile apps) running on the monitored users' mobile communication device from a monitored user's mobile communication device's operating system. This information may be used to facilitate the parsing and analysis of text messages, images, audio and video based on previously determined communication protocols, data structure definitions, formatting definitions, services, character formatting and/or device input protocols or formats learned or known about the protocols, data structures, formats, techniques or services implemented by each specific application (mobile app).

Again, it is preferred that the example application software is intended to enable communications, most preferably during run-time, between two or more mobile communication devices (e.g. cell phones, smartphones, iPads, iPods) in a peer to peer network architecture (scheme).

The summary and embodiments described herein are to be understood as being in every respect exemplary, but not restrictive, and the scope of the invention disclose herein is not to be determined strictly from the summary and embodiments, but rather as interpreted according to the full breadth permitted by the patent laws. It is understood that the embodiments described herein are only illustrative of the principles of the present invention and that various modifications may be implemented by those skilled in the art without departing from the scope and spirit of the invention. Those skilled in the art could implement various other feature combinations and additions without departing from the scope and spirit of the invention. For example, there are made embodiments that cite a single mobile communication device being monitored and it should be known that these embodiments can allow for multiple mobile communication devices being monitored. An example for which would be a parent who has two or more children that they wish to monitor mobile communications for.

As discussed throughout this document, various features and elements of some invention embodiments will be discussed and illustrated. It will be appreciated that such discussion is for the purposes of illustration only, and is not intended to limit the scope of the invention. As an example, many invention embodiments will find utility when practiced with portable phones such as cellular phones, smartphones, iPhones, Blackberry, Android, Windows phone or any mobile phone or mobile device with memory and processor running an operating system referred to herein as "cell phone" or "cell phones." Cell phone in the context of this specification also means a cellular phone with an operating system that is capable of running a mobile app. A common term (or name) for this type of phone is "smartphone". Examples of smartphones currently on the market include but are not limited to iPhone 5, Samsung Galaxy S5 and the Motorola Droid RAZR M.

It will be appreciated, however, that the inventive technology is useful with a wide variety of mobile communications devices, and cell phones with operating systems ("smartphones") are but one example. Such devices include but are not limited to portable processor based devices such as laptops, tablets, gaming devices, entertainment devices, music players, cameras, smart phones, dedicated devices, and others. Additionally, reference is made by way of illustration to texting and instant messaging. These are but two examples of electronic communications that different embodiments of the invention will find utility with. Additionally, many applications are described in the context of a parent monitoring a child. It will be appreciated that many other applications are likewise within the scope of the invention, with virtually any application in which a first user desires to monitor some aspects of communications occurring via a second user. It will be appreciated that the use of these terms herein is intended to illustrate specific embodiments only, and will be appreciated that many other devices/terms/technologies will be applicable.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method for monitoring mobile communication and generating alerts associated with targeted content, the method comprising:
    establishing a link between a monitoring user's mobile communication device and a monitored user's mobile communication device to receive communications for monitoring purposes;
    the monitored user's mobile communication device forwarding an incoming or outgoing communication to the monitoring user's mobile communication device;
    the monitored user's or monitoring user's mobile communication device generating an alert if the incoming or outgoing communication on the monitored user's mobile communication device contains targeted content; and
    the monitoring user's mobile communication device providing the alert indicating that the incoming or outgoing communication contains targeted content;
    wherein the outgoing communications forwarded from the monitored user's mobile communication device to the monitoring user's mobile communication device are implemented in a peer-to-peer network architecture;
    wherein the monitored user's mobile communication device receives or transmits an electronic message comprising one or more of text messages, images, audio clips, video clips, SMS or MMS messages;
    the monitored user's mobile communication device comparing the electronic message to a list of predefined text strings, images, audio clips, or video clips previously determined to be targeted content; and
    predicated on a match or a comparable match, the monitored user's mobile communication device forwarding (transmitting) the electronic message to the monitoring user's mobile communication device.

2. The method of claim 1, wherein a monitoring user's mobile communication device is authenticated to receive communications from the monitored user's mobile communication device for monitoring purposes.

3. The method of claim 1, wherein the incoming or outgoing communication comprises at least one text message or SMS message.

4. The method of claim 1, wherein the incoming or outgoing communication comprises at least one image or MMS message.

5. The method of claim 1, wherein the incoming or outgoing communication comprises at least one voice mail message.

6. The method of claim 1, wherein the incoming or outgoing communication comprises at least one live voice communication session or excerpt of a live voice communication session.

7. The method of claim 1, wherein the incoming or outgoing communication comprises at least one video clip.

8. The method of claim 1 further comprising:
    the monitoring user's mobile communication device further providing a description of the targeted content on the monitoring user's mobile communication device for review by the monitoring user.

9. The method of claim 1, wherein the incoming or outgoing communication comprises at least one electronic message.

10. The method of claim 1, wherein the forwarded communications from the monitored user's mobile communication device to the monitoring user's mobile communication device are exclusively outgoing (outbound) communications from the monitored user to one of more third parties.

11. The method of claim 1, wherein forwarded communications from the monitored user's mobile communication device to the monitoring user's mobile communication device are exclusively incoming (inbound) communications to the monitored user from one of more third parties.

12. The method of claim 1, wherein the monitored user's mobile communication device receives or is transmitting an electronic message comprising one or more of text messages, images, audio clips, video clips, SMS or MMS messages; and the monitored user's or monitoring user's mobile communication device comparing the electronic message to a list of predefined text strings, images, audio clips, and/or video clips previously determined to be targeted content; and predicated on a match or a comparable match, the monitored user's mobile communication device transmitting an alert to the monitoring user's communication device notifying that potential inappropriate or targeted content was detected or the monitoring user's mobile communication device generating an alert notifying that potential inappropriate or targeted content was detected.

13. The method of claim 1, wherein said established link comprises an authentication.

* * * * *